(12) United States Patent
Fukunaga

(10) Patent No.: US 6,530,055 B1
(45) Date of Patent: Mar. 4, 2003

(54) METHOD AND APPARATUS FOR RECEIVING AND DECODING CODED INFORMATION, INCLUDING TRANSFER OF ERROR INFORMATION FROM TRANSMISSION LAYER TO CODING LAYER

(75) Inventor: Shigeru Fukunaga, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/439,497

(22) Filed: Nov. 12, 1999

(30) Foreign Application Priority Data

Apr. 26, 1999 (JP) .............................. 11-118079

(51) Int. Cl.[7] .............................................. G06F 11/00
(52) U.S. Cl. ...................................................... 714/746
(58) Field of Search ................................ 714/746, 748, 714/751, 752, 758, 701, 703, 712, 48, 49, 50, 56, 14, 18; 370/244, 389, 474, 902, 912

(56) References Cited

U.S. PATENT DOCUMENTS 6,216,250 B1 * 4/2001 Williams
6,314,541 B1 * 11/2001 Seytter et al.
6,400,728 B1 * 6/2002 Ott

FOREIGN PATENT DOCUMENTS

JP 61-20748 1/1986
JP 10-79949 3/1998

OTHER PUBLICATIONS

*Video Coding for Audoivisual Services at p X 64 kbits ; Technical Paper of the Telecommunication Standardization Sector of ITU*; Mar. 1993.

* cited by examiner

Primary Examiner—Christine T. Tu
(74) Attorney, Agent, or Firm—Rabin & Berdo, P.C.

(57) ABSTRACT

Transmission units such as packets of coded data are received in a transmission layer, converted to coding units, supplied to a coding layer, and decoded in the coding layer. Errors in arriving transmission units are detected in the transmission layer. The results of error detection in the transmission layer are used when the coding units are decoded in the coding layer, preferably by having the transmission layer provide the coding layer with error information explicitly indicating which of the coding units are free of errors and which are not.

25 Claims, 21 Drawing Sheets

FIG.10A

| TIME = 10 (1010) |
|---|
| TIME = 10 (1010) |

ERROR →

FIG.10B

| TIME = 10 (1010) |
|---|
| (LOST) |

| (LOST) |
|---|
| TIME = 14 (1110) |

FIG.10C

| TIME = 10 (1010) | ← ERROR-FREE |
|---|---|
| TIME = 10 (1010) | ← CORRECTED |

METHOD AND APPARATUS FOR RECEIVING AND DECODING CODED INFORMATION, INCLUDING TRANSFER OF ERROR INFORMATION FROM TRANSMISSION LAYER TO CODING LAYER

BACKGROUND OF THE INVENTION

The present invention relates to apparatus for receiving and decoding coded information such as coded pictures or sound, more particularly to improved methods of handling coded information corrupted by transmission errors.

Moving pictures accompanied by sound are transmitted over telephone networks, computer networks, and other communication channels in videophone systems, videoconferencing systems, and video-on-demand systems. These communication systems are usually organized into hierarchical layers, including a coding layer, a transmission layer, and a physical layer.

In the coding layer, digitized pictures and sound are compressively coded at the transmitting terminal, and decoded at the receiving terminal. International standards applying to the coding layer include, among others, recommendations H.261 and H.263 of the Telecommunication Standardization Sector of the International Telecommunication Union (ITU-T), and the MPEG-1, MPEG-2, and MPEG-4 standards of the Moving Picture Experts Group. The MPEG standards have been adopted by the International Organization for Standardization (ISO).

In the transmission layer, coded data received from the coding layer are prepared for transmission on the physical layer, often by being divided into transmission units known as packets, and data received from the physical layer are passed back to the coding layer to be decoded, with appropriate processing such as the removal of packet headers. There are also international standards and de-facto industry standards applying to the transmission layer. Internet standards such as the Real-Time Transport Protocol/User Datagram Protocol/Internet Protocol (RTP/UDP/IP) and Transmission Control Protocol/Internet Protocol (TCP/IP) are well known, and there is a relevant ITU-T recommendation (H.223) directed toward multiplexing for low-speed terminals. Incidentally, the transmission layer is referred to as the adaptation layer in recommendation H.223.

The physical layer includes the transmitters, receivers, cables, wireless links, switches and other facilities that actually transmit the data. These facilities are prone to various types of transmission errors. For example, bit values may be altered by noise, particularly on wireless links; bits may be lost because of synchronization problems; and entire packets may be lost because of congestion in switching facilities. The terms 'error' and 'transmission error' will be used below to refer to all of these types of errors, including packet loss.

Even minor errors can have serious effects on the decoding of coded picture data. For example, the moving-picture coding standards mentioned above employ variable-length codes. A single bit error can disguise the locations of the boundaries between codewords, causing the decoder to lose synchronization with the variable-length code and decode all data from the point of the error onward incorrectly.

Various measures are taken in the coding layer to limit the effect of errors. One measure is to insert synchronization words, having a unique bit sequence that could not be produced by any combination of variable-length codewords, at regular intervals in the coded data. If the decoder loses synchronization because of an error, it can resynchronize by recognizing the unique bit sequence of a synchronization codeword. In moving-picture transmission systems, a synchronization codeword or start code is generally placed at the beginning of each frame. In some systems, each frame is divided into smaller coding units, and a synchronization word is inserted between each two of these coding units, limiting the immediate effect of an error to one coding unit. The coding units are variously known as slices, groups of blocks, and video packets; the term 'slice' will be used generically below to refer to any coding unit smaller than a frame.

In the coding layer, errors can be detected by the occurrence of illegal values and the violation of coding syntax rules. When an error is recognized, steps are taken to conceal it. In the simplest error concealment method employed with moving-picture data, the entire frame or slice in which the error occurred is replaced with data from the preceding frame, or the corresponding slice in the preceding frame. Other error-concealment methods discard only part of a slice, such as the part following the error, or replace the slice with data taken from other parts of the preceding frame, guided by motion vectors taken from the preceding frame.

Error countermeasures are also taken in the transmission layer. In some systems, a redundant error-correcting code is added to the transmitted data, enabling the receiving terminal to detect and correct errors if the errors are not too severe. If the bit error rate in the physical layer is low enough, a modest amount of redundancy enables most errors to be corrected and substantially all errors to be at least detected in the transmission layer.

Other standard practices are to add sequence numbers to packets, so that packet loss can be detected, and to add check bits such as cyclic redundancy check bits (CRC bits) to each packet, so that packets corrupted by transmission errors can at least be identified as erroneous. If a packet is lost or corrupted, the receiving device can then request retransmission of the packet, waiting until each packet is correctly received before passing the data on to be decoded in the coding layer. Sequence numbers also enable packets to be passed to the coding layer in the correct order, even if they arrive out of order, because of taking different routes through a network, for example.

Moving pictures and sound are often transmitted in real time, however, so the transmission layer may not be able to wait for late packets to arrive, or for erroneous packets to be retransmitted. The overall result is that even when the transmission layer can detect a transmission error, it cannot always correct the error.

When a layered system of the type described above is designed, the conventional practice is to design the separate layers independently, so that, for example, the transmission layer is compatible with any type of physical layer, and with any type of coding layer, and the coding layer is compatible with any type of transmission layer. A consequence of this independence is that the coding layer cannot rely on the transmission layer to detect errors or provide information about missing or erroneous data. Accordingly, even when such information is available in the transmission layer, it is not used in the coding layer.

This is obviously inefficient, and the inefficiency has various undesirable consequences, including reduced picture quality, reduced sound quality, added hardware and software costs, increased processing time, increased power consumption, and a degree of error immunity that, in many moving-picture transmission systems, cannot be considered robust. It is particularly unfortunate that the coding layer is sometimes unable to detect errors that have already been detected, although not corrected, in the transmission layer. From the user's point of view, what matters is not the independence of the layers but the quality of the reproduced picture or sound, and in conventional systems there is considerable room for improvement.

SUMMARY OF THE INVENTION

It is accordingly an object of the present invention to improve the error-handling functions of a layered system that receives and decodes coded data.

Another object of the invention is to speed up the processing the received data.

Another object is to reduce power consumption by the apparatus that receives and decodes the data.

A more particular object is to prevent serious degradation of picture quality caused by errors in the transmission of coded moving-picture data.

The invented method of receiving and decoding coded data concerns a system having a transmission layer and a coding layer, in which the coded data are divided into transmission units which are received separately in the transmission layer. The transmission layer detects errors in each transmission unit and converts the received data to coding units, which have a definite relation to the transmission units. The coding units are decoded separately in the coding layer.

According to the invented method, the results of error detection performed in the transmission layer are used when the coding units are decoded in the coding layer.

Preferably, the transmission layer provides the coding layer with error information explicitly indicating which of the coding units are free of errors.

This error information may be used by, for example, skipping error checks of error-free coding units in the coding layer; performing error concealment when an error detected in the transmission layer is not detected in the coding layer; or avoiding the use of possibly erroneous data as reference data in predictive decoding. The error information can also be used to position coding units correctly, or to distinguish between correct and incorrect values when the same information appears repeatedly in different coding units. If the coded data constitute an encoded moving picture, the error information can be used to place each coding unit in the correct frame of the moving picture. If a coding unit is retransmitted, the error information can be used to recognize cases in which all received versions of the coding unit are erroneous, so that steps can be taken to select the least erroneous received data.

The invention also provides apparatus for receiving and decoding coded data, employing the invented method.

BRIEF DESCRIPTION OF THE DRAWINGS

In the attached drawings:

FIGS. 10A, 10B, and 10C illustrate the effect of the fourth embodiment;

DETAILED DESCRIPTION OF THE INVENTION

Figure 1:
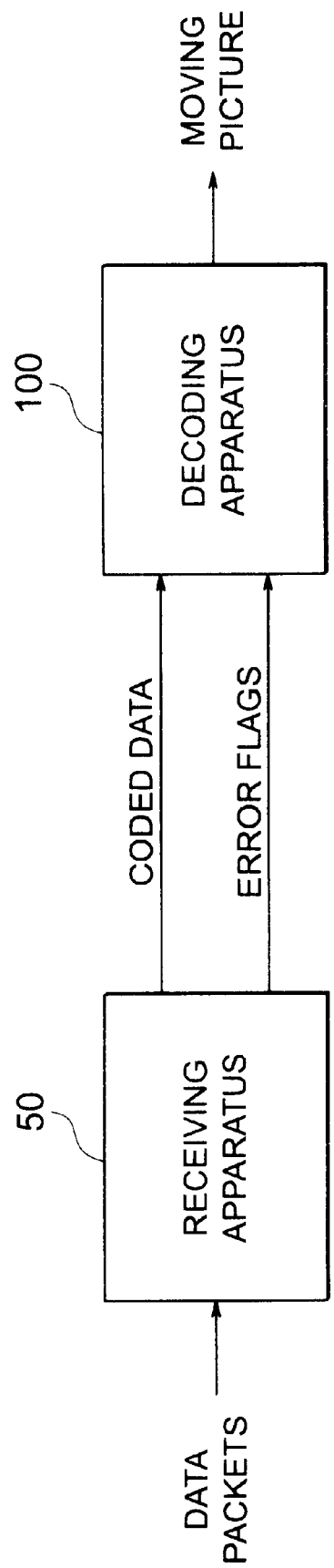
FIG. 1 is a block diagram of an apparatus for receiving and decoding coded information.

Embodiments of the invention will be described with reference to the attached drawings, in which like parts are indicated by like reference characters.

The embodiments concern apparatus for receiving and decoding coded moving pictures, having the general configuration shown in FIG. 1. The apparatus operates in a communication system having a transmission layer and a coding layer. The apparatus includes a receiving apparatus 50, which is part of the transmission layer, and a decoding apparatus 100, which is part of the coding layer.

The receiving apparatus 50 receives packets of coded moving-picture data. Each packet includes a header including source and destination address information and other overhead, and a certain amount of coded moving-picture data. The amount may be fixed or variable, depending on the transmission rules of the system. Each packet includes redundant bits such as parity bits or CRC bits, for at least detecting errors, and preferably for detecting and correcting errors. The receiving apparatus 50 removes the overhead information, corrects any correctable errors in the coded moving-picture data, sets error flags marking uncorrectable errors, and supplies both the coded moving-picture data and the error flags to the decoding apparatus 100.

The packets preferably have sequence numbers, as described in the H.223 and TCP/IP standards, for example, enabling the receiving apparatus 50 to detect out-of-order packets and missing packets. The receiving apparatus 50 rearranges out-of-order packets so that the coded data are supplied to the decoding apparatus 100 in the correct order. For missing packets, the receiving apparatus 50 supplies dummy data and sets an error flag.

The above processing converts the received data from transmission units to coding units, where a transmission unit is the amount of data included in one packet, and a coding unit is the amount of coded data making up one frame, or one slice of a frame, in the moving picture. The relationship between transmission units and coding units may be a one-to-one relationship, a many-to-one relationship, or any other type of definite relationship that enables an uncorrectable error detected in a transmission unit to be assigned to a particular coding unit. The error flags provided from the receiving apparatus 50 to the decoding apparatus 100 constitute error information indicating which of the coding units are free of errors, and which coding units have missing data or contain other errors.

The decoding apparatus 100 decodes each coding unit received from the receiving apparatus 50 to obtain digitized moving-picture data. The decoding apparatus 100 also detects errors, and takes action to conceal errors so as to minimize degradation of the reproduced moving picture. In detecting and concealing errors, the decoding apparatus 100 makes use of the error information supplied by the receiving apparatus 50. After any necessary error concealment, the digitized moving-picture data are output to a monitor display device (not visible).

The receiving apparatus 50 differs from a conventional receiving apparatus 50 only in supplying error information to the decoding apparatus 100. The descriptions of the following embodiments will therefore focus on the decoding apparatus 100. The receiving apparatus 50 will also be referred to generically as the 'transmission layer.'

1st Embodiment

Figure 2:
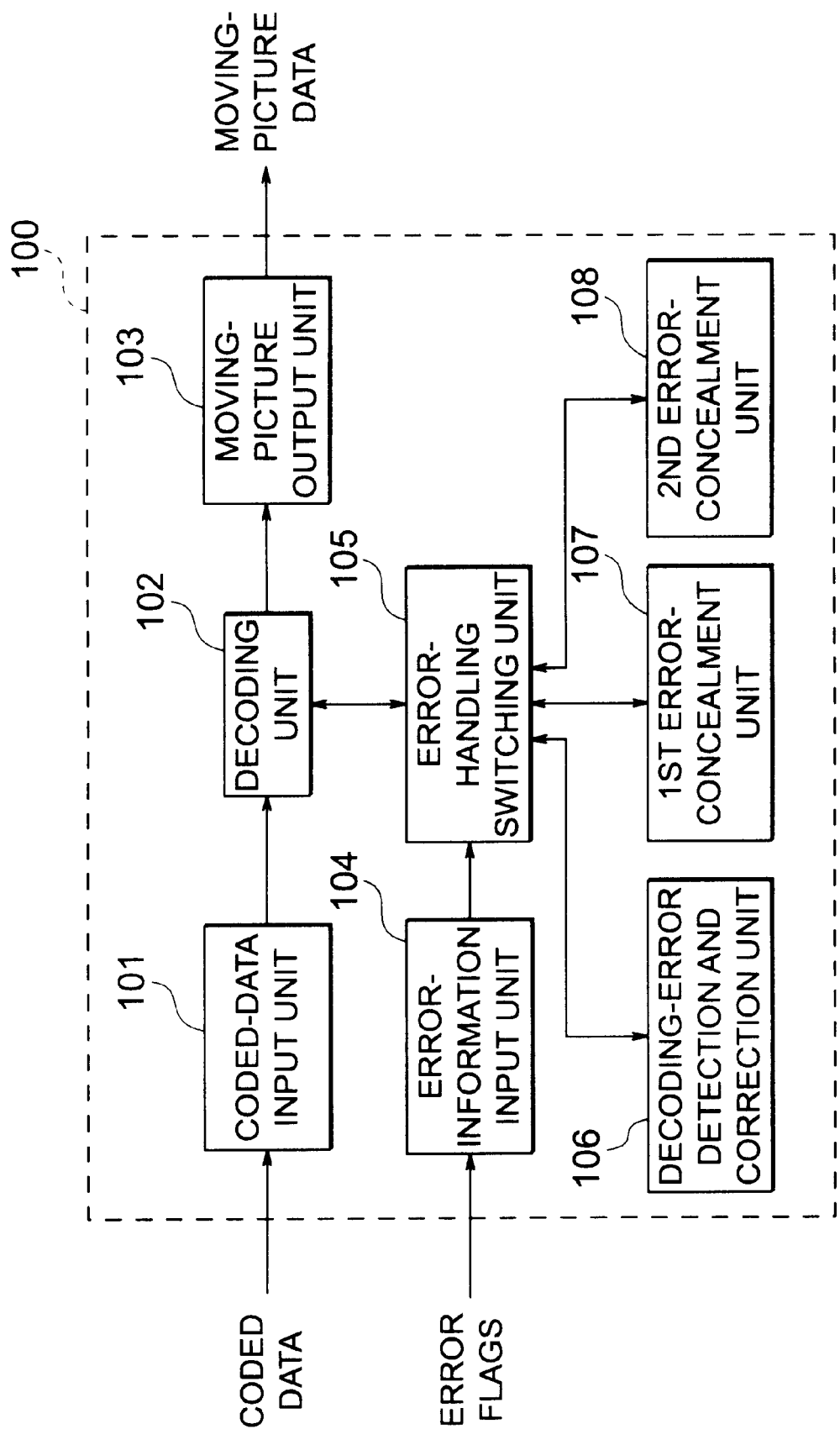
FIG. 2 is a block diagram of the decoding apparatus in a first embodiment of the invention.

The decoding apparatus 100 in the first embodiment, shown in FIG. 2, comprises a coded-data input unit 101, a decoding unit 102, a moving-picture output unit 103, an error-information input unit 104, an error-handling switching unit 105, a decoding-error detection and correction unit 106, a first error-concealment unit 107, and a second error-concealment unit 108.

The coded-data input unit 101 receives coded moving-picture data from the transmission layer, stores the received data in an internal buffer memory (not visible) recognizes coding units, and supplies the received data to the decoding unit 102, one coding unit at a time. Coding units (frames, slices) are recognized from synchronization words, start codes, or the like.

The decoding unit 102 decodes each coding unit under control of the error-handling switching unit 105, and supplies the decoded data to the moving-picture output unit 103. The decoding process includes, for example, variable-length decoding, dequantization, and an inverse discrete cosine transform. Predictive or inter-frame coding may be employed, in which case the decoding unit 102 decodes each frame with reference to a preceding frame. Motion compensation may also be employed in this case. The error-handling switching unit 105 may instruct the decoding unit 102 to supply each decoded data field to the decoding-error detection and correction unit 106. A field is a unit of data, smaller than a coding unit, containing only one data value or one type of data. Fields are produced at intermediate stages in the decoding process. The decoding-error detection and correction unit 106 returns the field to the decoding unit 102, possibly with corrections of the field contents, and the decoding unit 102 continues the decoding process, using the corrected data. On instruction from the decoding-error detection and correction unit 106 or error-handling switching unit 105, the decoding unit 102 may stop decoding, supply the data decoded so far in the current coding unit to the first error-concealment unit 107, and receive an error-concealed coding unit from the first error-concealment unit 107 for output to the moving-picture output unit 103.

The decoding unit 102 also supplies the error-handling switching unit 105 with information indicating the position of each coding unit. If the coding units are frames, for example, the decoding unit 102 supplies the error-handling switching unit 105 with a temporal reference indicating the position of the frame on the time axis. The temporal reference constitutes one field in the coding unit in this case. If the coding units are slices, the decoding unit 102 supplies both the temporal reference of the frame and information such as macroblock numbers giving the spatial position of the slice in the frame. A macroblock, incidentally, is a small rectangular area in the picture, constituting part of a slice. The error-handling switching unit 105 may pass the information indicating the temporal and spatial position of the current coding unit to the second error-concealment unit 108, and instruct the decoding unit 102 to receive an error-concealed preceding coding unit from the second error-concealment unit 108, for output to the moving-picture output unit 103.

If the decoding unit 102 receives only dummy data from the coded-data input unit 101 for the current coding unit, the decoding unit 102 notifies the error-handling switching unit 105.

The moving-picture output unit 103 converts the decoded or error-concealed data received from the decoding unit 102 to a signal for output to a monitor display device (not visible).

The error-information input unit 104 receives error information for each coding unit from the transmission layer, and passes the received error information to the error-handling switching unit 105. The error information comprises error flags that are active or inactive, depending on whether or not an uncorrectable error was found in the transmission layer. As noted above, a missing packet is indicated by an active error flag.

The error-handling switching unit 105 uses the error flags to control the error-related processing of each coding unit. If the error flags indicate that the current coding unit is free of errors, the error-handling switching unit 105 deactivates the decoding-error detection and correction unit 106 and first error-concealment unit 107, allowing the decoding unit 102 to pass the decoded data directly to the moving-picture output unit 103. If the error flags indicate the presence of an uncorrected error in the current coding unit, the error-handling switching unit 105 activates the decoding-error detection and correction unit 106 and first error-concealment unit 107. If notified by the decoding unit 102 of dummy data, received due to packet loss, the error-handling switching unit 105 activates the first error-concealment unit 107 without activating the decoding-error detection and correction unit 106. The error-handling switching unit 105 also checks the information received from the decoding unit 102, indicating the temporal and spatial position of the current coding unit. If there is a gap between the current coding unit and the preceding coding unit, indicating that one or more coding units were not received, the error-handling switching unit 105 activates the second error-concealment unit 108.

The decoding-error detection and correction unit 106 checks each received field to detect errors. Among the detected errors are variable-length codewords not appearing in the coding table, syntax violations, and illegal numerical values. When the decoding-error detection and correction unit 106 finds an error, it attempts to correct the error on the basis of related coded data. If the error can be corrected, the corrected value is returned to the decoding unit 102. If an error cannot be corrected, the decoding-error detection and correction unit 106 estimates the severity of the error. If the error is severe enough that continued decoding would lead to serious picture degradation, the decoding unit 102 is instructed to stop decoding the current coding unit.

When the decoding-error detection and correction unit 106 halts decoding by the decoding unit 102, the first error-concealment unit 107 conceals the error, using data that were coded up to the point at which decoding was stopped. Various error concealment methods can be employed, such as replacing the entire current frame with the preceding frame, or replacing the current coding unit in the current frame with the corresponding coding unit in the preceding frame, or replacing the erroneous part of the current coding unit with the corresponding part from the previous frame. If motion vectors are available, motion compensation may be included in the error-concealment process.

When one or more entire coding units are lost in transmission, due to packet loss, for example, the second error-concealment unit 108 returns to the point at which the data loss began and carries out error concealment from that point onward. When packet loss extends over two frames, the second error-concealment unit 108 completes error concealment of the first of the two frames, and returns that frame to the decoding unit 102, before beginning error concealment of the second of the two frames. When packet loss includes the last part of the preceding frame and the first part of the present frame, after the preceding frame has been regenerated and stored in a memory area (not visible), the current frame is preferably generated in the same memory area, so that the missing parts are automatically filled with the data from the preceding frame, eliminating the need to carry out the same error-concealment process twice.

The decoding-error detection and correction unit 106 and the first and second error-concealment units 107, 108 are not limited to the methods of error detection and concealment described above. The methods described in Japanese Unexamined Patent Applications 61-20478 and 10-79949 can also be used, for example.

The above elements of the decoding apparatus 100 comprise arithmetic, logic, and memory circuits, detailed descriptions of which will be omitted.

Figure 3:
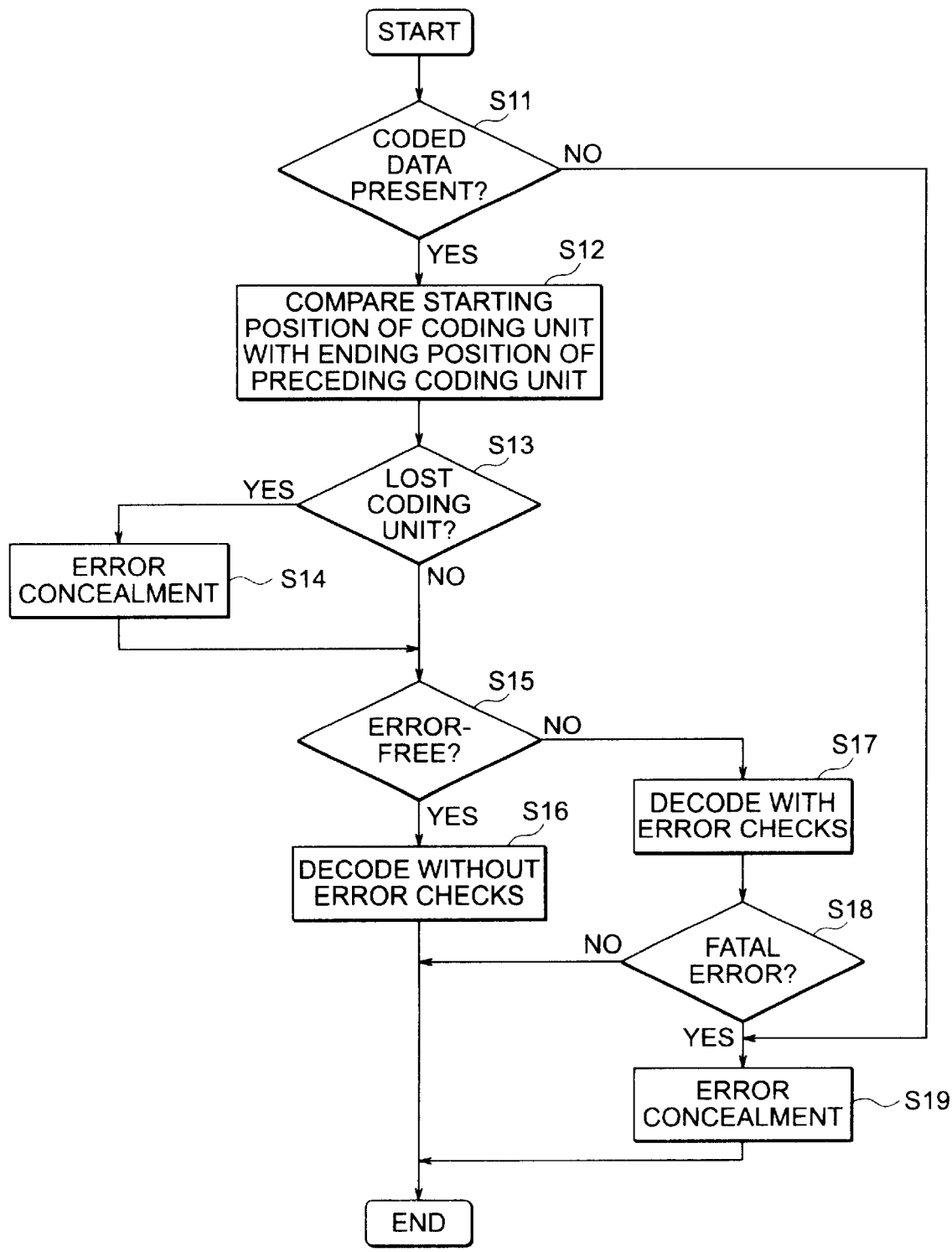
FIG. 3 is a flowchart illustrating the operation of the first embodiment.

Next, the operation of the first embodiment will be described. FIG. 3 illustrates the decoding of one coding unit.

The receiving apparatus 50 in the transmission layer supplies the decoding apparatus 100 with coded data and error information for the coding unit. The decoding unit 102 and error-handling switching unit 105 check to make sure that coded data, rather than dummy data, are actually present (step S11).

If coded data are present, the decoding unit 102 starts by decoding the information indicating the position of the coding unit. If the coding unit is a frame, the decoding unit 102 decodes the temporal-reference field. If the coding unit is a slice, the decoding unit 102 also decodes the macroblock numbers indicating, for example, the start and end of the slice. The error-handling switching unit 105 compares the starting position of the coding unit with the ending position of the preceding coding unit (step S12). The error-handling switching unit 105 thereby decides whether any coding units have been lost between the current and preceding coding units (step S13). In case of loss, the second error-concealment unit 108 generates data for the lost coding unit or units, thereby concealing the error (step S14).

Following step S13 or S14, the error-handling switching unit 105 checks the error flags to determine whether the coding unit about to be decoded is flagged as containing erroneous data (step S15). If the coding unit is indicated to be error-free, the decoding unit 102 decodes the coding unit without further error checks, and the moving-picture output unit 103 outputs the resulting frame or slice of the moving picture (step S16).

If the coding unit is flagged as containing an error, the decoding-error detection and correction unit 106 checks each field of the coded data (step S17), detects errors, corrects any detected errors if possible, and decides whether a serious uncorrectable decoding error is left (step S18). If there are no errors left, or only minor errors, the decoded data are output to the moving-picture output unit 103. If a serious or fatal error is left, the first error-concealment unit 107 carries out error concealment (step S19). The first error-concealment unit 107 also carries out error concealment (step S19) if the decoding unit 102 finds dummy data in step S11.

The first embodiment corrects and conceals error in much the same manner as a conventional apparatus, but by using the error flags supplied by the transmission layer, the decoding apparatus 100 is able to bypass the error checking and concealing steps when the data supplied by the transmission layer have no detected errors. Under normal conditions, the error checking and concealing steps are thereby bypassed for most of the coding units, reducing the amount of decoding processing, saving time, and reducing the power consumption of the decoding apparatus.

In a variation of the first embodiment, the receiving apparatus 50 discards data having uncorrectable errors, and provides the decoding apparatus 100 only with error-free data. In this case the error-information input unit 104 and decoding-error detection and correction unit 106 can be omitted. In FIG. 3, steps S11 to S14, S16, and S19 are performed, with discarded data being detected in step S11. If the receiving apparatus 50 provides complete coded data for the current coding unit, the decoding unit 102 decodes the data without error checking. If the error-handling switching unit 105 detects a gap between the current coding unit and the preceding coding unit, the second error-concealment unit 108 carries out error concealment for the coding unit or units in the gap. If the receiving apparatus 50 does not provide complete coded data for the current coding unit, the first error-concealment unit 107 performs error concealment for the current coding unit. If the error detection results obtained in the receiving apparatus 50 are used in this way, the amount of processing performed in the decoding apparatus 100 can be reduced to a minimum.

In another variation, the receiving apparatus 50 does not provide dummy data or error flags for missing packets, and step S11 in FIG. 3 is eliminated. This variation is applicable when each transmission unit includes one or more entire coding units. Error concealment for missing coding units is carried out in step S14.

2nd Embodiment

In the second embodiment, the receiving apparatus 50 supplies packet sequence numbers, as well as the coded data and error flags, to the decoding apparatus. The decoding apparatus uses the sequence numbers to simplify the procedure for switching among different types of error processing, and to handle errors more accurately.

Figure 4:
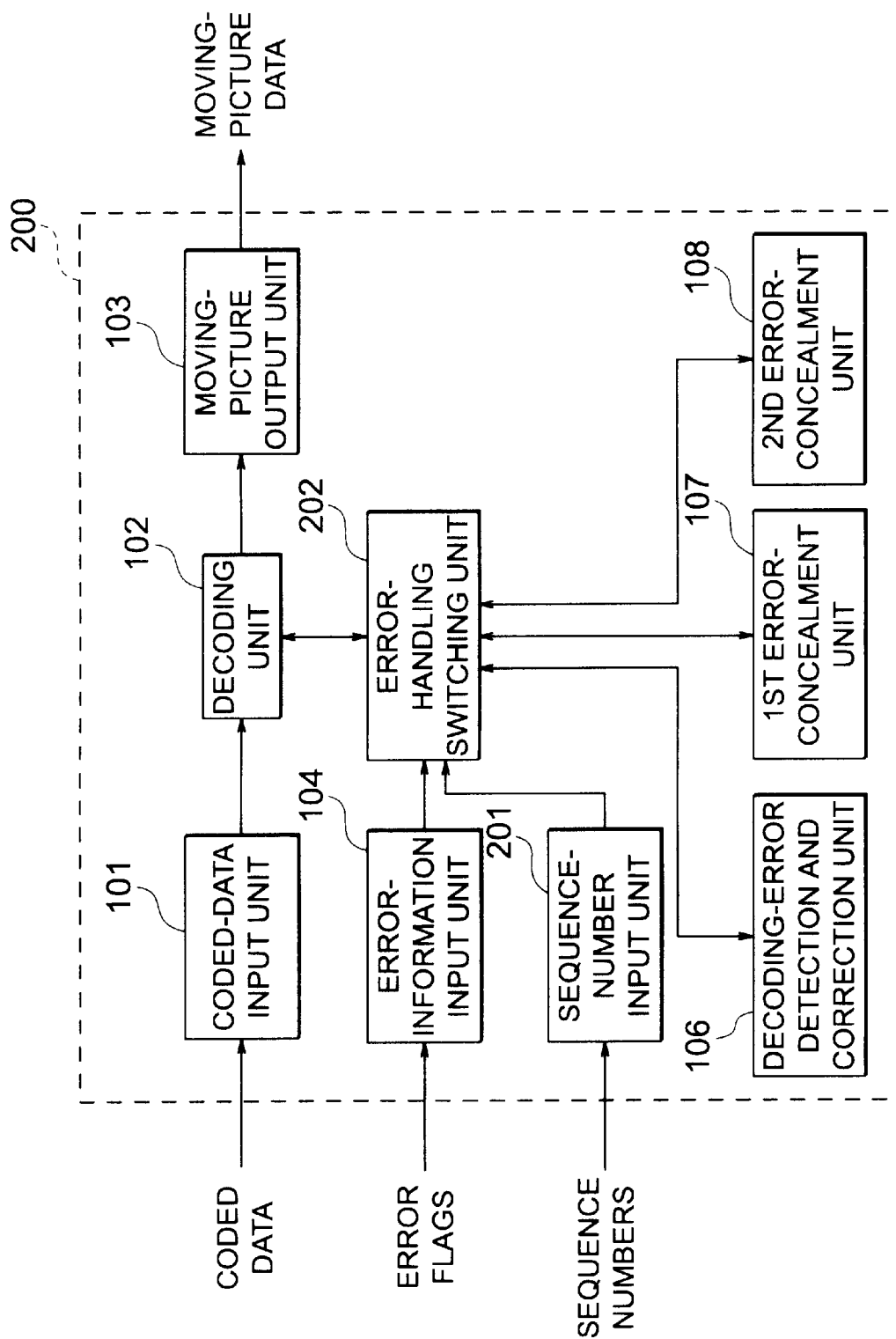
FIG. 4 is a block diagram of the decoding apparatus in a second embodiment.

Referring to FIG. 4, the decoding apparatus 200 in the second embodiment comprises a coded-data input unit 101, decoding unit 102, moving-picture output unit 103, error-information input unit 104, decoding-error detection and correction unit 106, and error-concealment units 107, 108 as described in the first embodiment. The second embodiment also comprises a sequence-number input unit 201 that receives and temporarily stores the sequence numbers supplied by the transmission layer. The sequence numbers are read from the sequence-number input unit 201 by the error-handling switching unit 202, which has functions similar to the functions of the error-handling switching unit in the first embodiment, but uses the sequence numbers in carrying out these functions.

Figure 5:
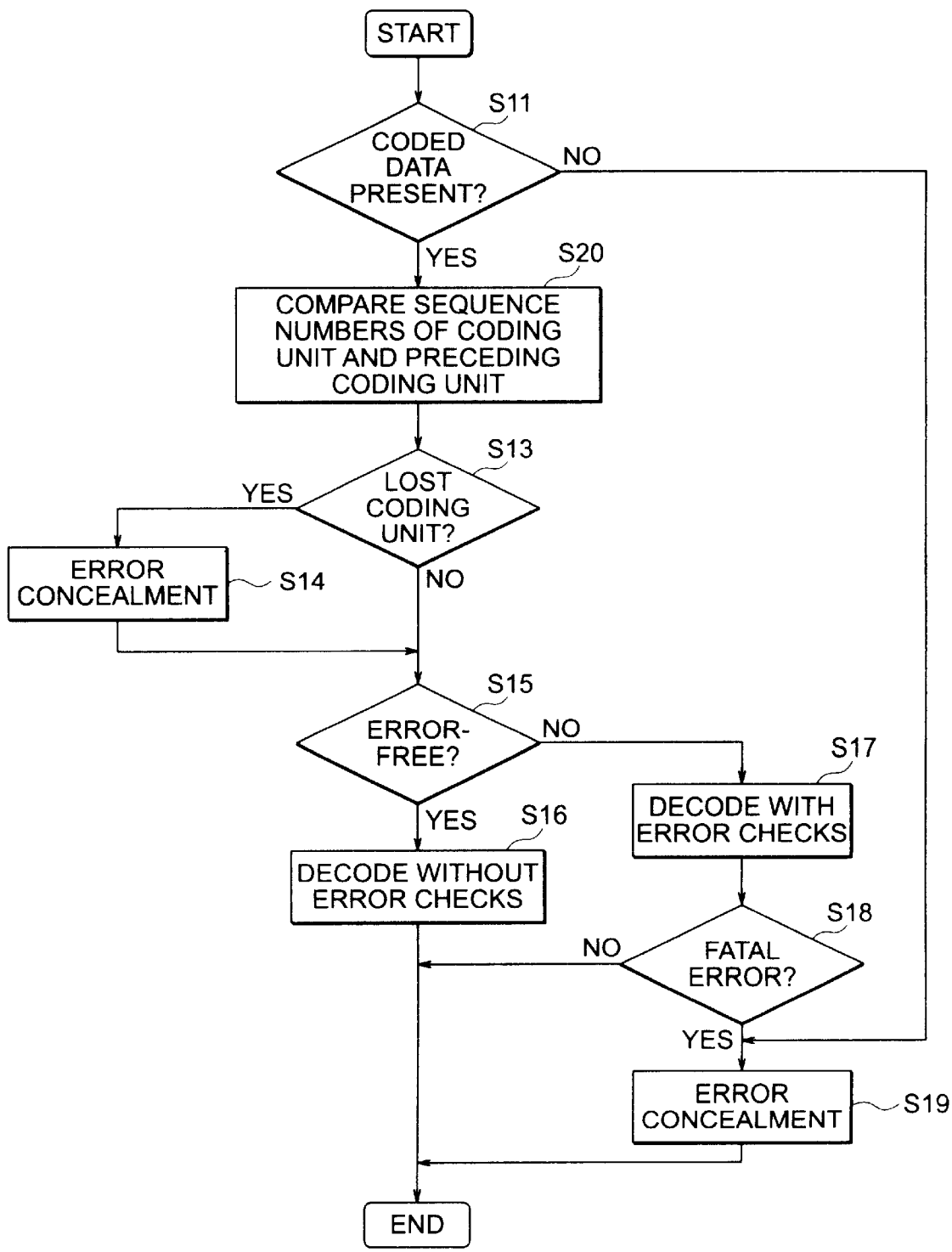
FIG. 5 is a flowchart illustrating the operation of the second embodiment.

The operation of the second embodiment will be described with reference to FIG. 5, which illustrates the processing of one coding unit.

As in the first embodiment, the initial step is to determine whether coded data, as opposed to dummy data, have been received for the coding unit (step S11). If coded data have been received, the error-handling switching unit 202 reads the sequence number or numbers corresponding to the received data, and compares them with the sequence number (s) attached to the preceding coding unit (step S20). By comparing the sequence numbers, the error-handling switching unit 202 decides whether any data have been lost (step S13).

The succeeding steps from step S14 to S19 are identical to the corresponding steps in the first embodiment, so descriptions will be omitted. The difference between the first and second embodiments is that the error-handling switching unit 202 in the second embodiment is able to detect data loss in step S13 without having to refer to spatial and temporal position information, and can decide whether error concealment is necessary for a preceding coding unit even before the decoding unit 102 starts decoding the current coding unit. Detecting data loss from sequence numbers is also more accurate than using spatial and temporal position information, which may be affected by decoding errors. Step S13 is thus carried out in a simpler and more reliable way than in the first embodiment.

In a variation of the second embodiment, the receiving apparatus 50 does not supply sequence numbers to the decoding apparatus 200, and does not supply dummy data for lost packets, but notifies the decoding apparatus 200 when a packet is lost. In step S20 in FIG. 5, the error-handling switching unit 202 only has to note the presence or absence of such a packet-loss notification.

3rd Embodiment

The third embodiment uses the error information supplied from the transmission layer to detect errors that would otherwise have been missed in the coding layer.

Figure 6:
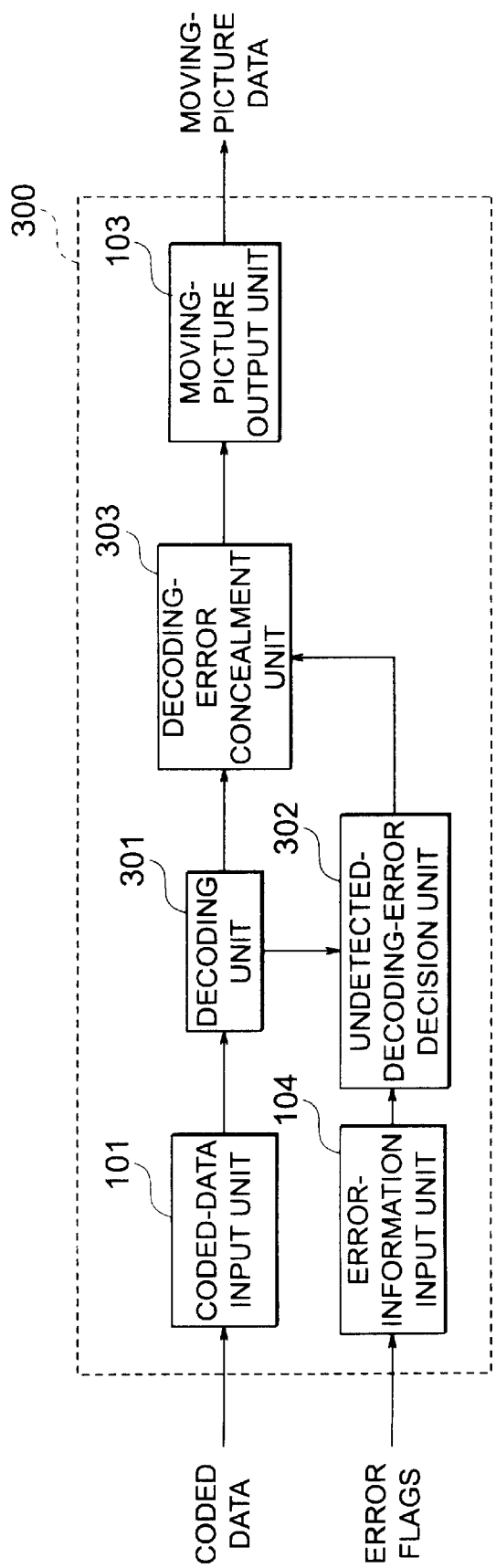
FIG. 6 is a block diagram of the decoding apparatus in a third embodiment.

Referring to FIG. 6, the decoding apparatus 300 in the third embodiment comprises a coded-data input unit 101, moving-picture output unit 103, and error-information input unit 104 as described in the first embodiment, a modified decoding unit 301, and an undetected-decoding-error decision unit 302 and decoding-error concealment unit 303.

The decoding unit 301 combines the functions of the decoding unit 102, decoding-error detection and correction unit 106, and error-concealment units 107, 108 of the first embodiment. While decoding the current coding unit, the decoding unit 301 also checks the validity of the data, detecting illegal codewords, illegal numerical values, and other violations of coding rules, and corrects any detected errors on the basis of related valid data, if possible. If unable to correct a serious error, the decoding unit 301 stops decoding and performs error concealment instead. In case of missing data, the error concealment may extend over one or more preceding coding units. The decoding unit 301 also notifies the undetected-decoding-error decision unit 302 of any errors detected, and any corrections made or error concealment performed. At the end of this process, the decoding unit 301 outputs a decoded or error-concealed coding unit to the decoding-error concealment unit 303.

The undetected-decoding-error decision unit 302 compares the error flags received by the error-information input unit 104 with the error-detection and error-concealment notifications received from the decoding unit 301, decides whether the decoding unit 301 may have overlooked a serious error, requiring error concealment to avoid possible serious picture degradation, and notifies the decoding-error concealment unit 303 if error concealment is required. The undetected-decoding-error decision unit 302 may, for example, request error concealment whenever the error flags indicate the presence of an error that the moving-picture output unit 103 does not detect. Alternatively, the undetected-decoding-error decision unit 302 may compare the individual picture elements or pixels of the decoded data output by the decoding unit 301 with the corresponding pixels of the preceding frame, and request error concealment only if there is a large difference in pixel values. If the coding unit is one slice of a frame, the undetected-decoding-error decision unit 302 may also compare the decoded slice with adjacent slices in the same frame.

When so requested by the undetected-decoding-error decision unit 302, the decoding-error concealment unit 303 performs error concealment by, for example, replacing the decoded data received from the decoding unit 301 with data taken from the preceding frame, preferably with motion compensation.

Figure 7:
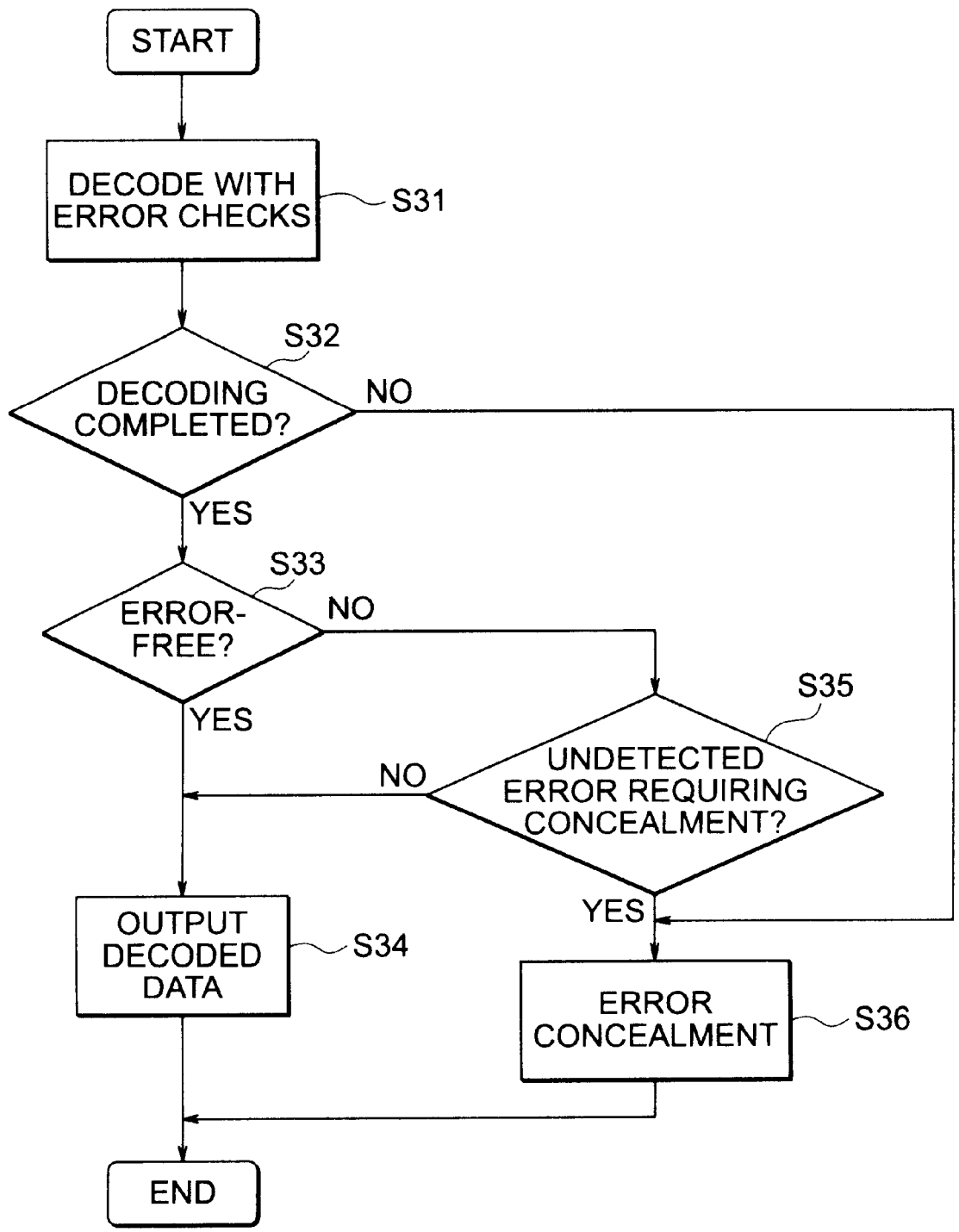
FIG. 7 is a flowchart illustrating the operation of the third embodiment.

Next, the operation of the third embodiment will be described. FIG. 7 illustrates the processing of one coding unit.

The coded data are decoded by the decoding unit 301, which also detects decoding errors, and corrects the errors if possible (step S31). The decoding unit 301 indicates to the undetected-decoding-error decision unit 302 whether it was able to decode the entire coding unit, or had to stop decoding at some point because of an uncorrectable error (step S32). If the decoding unit 301 was able to decode the entire coding unit, the undetected-decoding-error decision unit 302 checks the error flags received from the transmission layer to decide whether the coding unit was really error-free (step S33). If the error flags indicate that the coding unit was error-free, the decoded unit is output without further changes (step S34). If the error flags indicate that the coding unit was not error-free, the undetected-decoding-error decision unit 302 decides whether to request error concealment (step S35). Error concealment is carried out (step S36) if requested by the undetected-decoding-error decision unit 302, or if required because the decoding unit 301 could not decode the entire coding unit. If the decoding unit 301 was able to decode the coding unit completely and the undetected-decoding-error decision unit 302 does not request error concealment, the decoded unit is output without further changes (step S34).

In contrast to the first embodiment, the decoding apparatus 300 in the third embodiment always checks for decoding errors, even if the error information does not indicate the presence of any errors. Furthermore, even if no decoding errors are detected, the third embodiment may perform error concealment if the error information indicates that an undetected decoding error may be present. The third embodiment accordingly provides a very high degree of protection against decoding errors.

Under current coding standards, it is difficult to detect errors in certain critical fields, such as the field indicating the type of coding employed (intra-frame or inter-frame), the temporal reference field, and the quantization step-size field. This is particularly true of fixed-length fields. For example, if the quantization step size is coded as a fixed-length four-bit value, then a one-bit error can change the quantization step size from, for example, ten ('1010') to two ('0010'). This bit error does not violate any coding rules, and cannot be detected directly. The error is detected only if it causes a secondary error, such as a dequantized numerical value having an illegal value. If no such secondary errors occur, the quantization step-size error remains undetected, with possibly serious effects on the decoded picture.

By comparing the decoded pixel values with the pixel values in neighboring slices or in the preceding frame, the undetected-decoding-error decision unit 302 can detect such serious effects and request error concealment. As a simpler and more conservative approach, as noted above, the undetected-decoding-error decision unit 302 can request error concealment in all cases in which an error flag indicates the presence of an error that the decoding unit 301 does not detect, tolerating the minor picture degradation that may be caused by unnecessary error concealment in order to eliminate substantially all risk of major picture degradation.

By using the error flags provided by the transmission layer to detect decoding errors that were missed in the coding layer, the third embodiment reliably avoids the more serious types of picture degradation.

In a variation of the third embodiment, the decoding unit 301 relaxes or eliminates the data validity checks when the error flags do not indicate the presence of an error in the coding unit.

4th Embodiment

Some coding standards provide for the repeated transmission of important information. In the H.263 and MPEG-4 standards, for example, part of the information given in the picture header of a frame may also be inserted in the header of each slice in the frame. In one scheme, the header of the first slice in a frame begins with a picture synchronization word followed by a frame temporal reference, the picture size, the quantization step size, and other information, while the header of each subsequent slice in the frame begins with a slice synchronization word, the frame temporal reference, the quantization step size, and other information. In this case, the same frame temporal reference is repeated in each slice, and the same quantization step size may also be repeated, depending on a separate flag given in the frame header, indicating whether different slices may have different quantization step sizes.

When information is repeated in this way, the fourth embodiment uses the error information supplied from the transmission layer to distinguish between valid and invalid instances of the repeated information, and to correct invalid instances.

Figure 8:
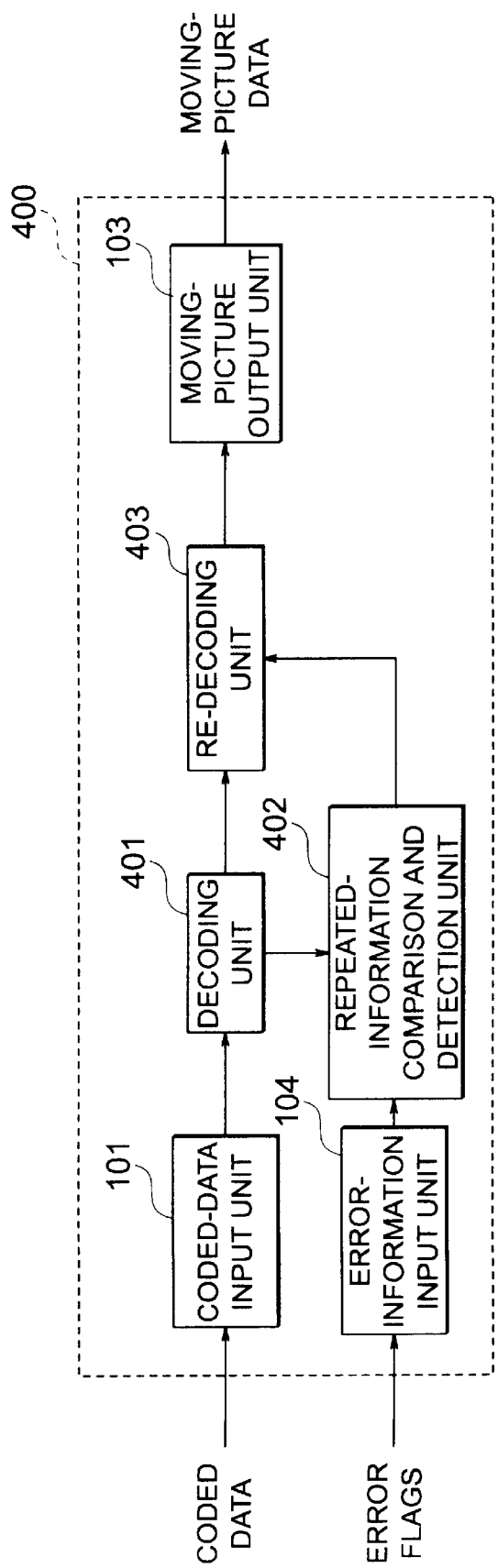
FIG. 8 is a block diagram of the decoding apparatus in a fourth embodiment.

Referring to FIG. 8, the decoding apparatus 400 in the fourth embodiment comprises a coded-data input unit 101, moving-picture output unit 103, and error-information input unit 104 as described in the first embodiment, a modified decoding unit 401, and a repeated-information comparison and correction unit 402 and re-decoding unit 403.

The decoding unit 401 decodes each received coding unit, passes both the coded and the decoded data to the re-decoding unit 403, and passes any repeated information included in the coded data to the repeated-information comparison and correction unit 402. The decoding unit 401 may receive corrected information in return from the repeated-information comparison and correction unit 402, in which case the decoding unit 401 uses the corrected information in the decoding process. In decoding the data, the decoding unit 401 also checks the data validity, detects illegal codewords, illegal numerical values, and other violations of coding rules, and preferably corrects any detected errors on the basis of related valid data, if possible. If unable to correct a serious error, the decoding unit 401 stops decoding and performs error concealment instead.

The repeated-information comparison and correction unit 402 temporarily stores the repeated information received from the decoding unit 401 and the error flags supplied by the error-information input unit 104, and compares the repeated information received in different coding units. If two values that should be identical are found to differ, the repeated-information comparison and correction unit 402 uses the error flags to decide which value is correct, corrects the incorrect value, and provides the corrected value to the decoding unit 401, if it pertains to the present coding unit, or to the re-decoding unit 403, if it pertains to a previous coding unit.

The re-decoding unit 403 temporarily stores the coded and decoded data received from the decoding unit 401. Upon receiving a corrected value pertaining to a previous coding unit from the repeated-information comparison and correction unit 402, the re-decoding unit 403 decodes that previous unit again, using the corrected value. Depending on the extent of the effect of the correction, the re-decoding unit 403 may repeat the entire process of decoding the coded data of the previous coding unit, or may simply replace necessary values in the decoded data provided by the decoding unit 401.

Figure 9:
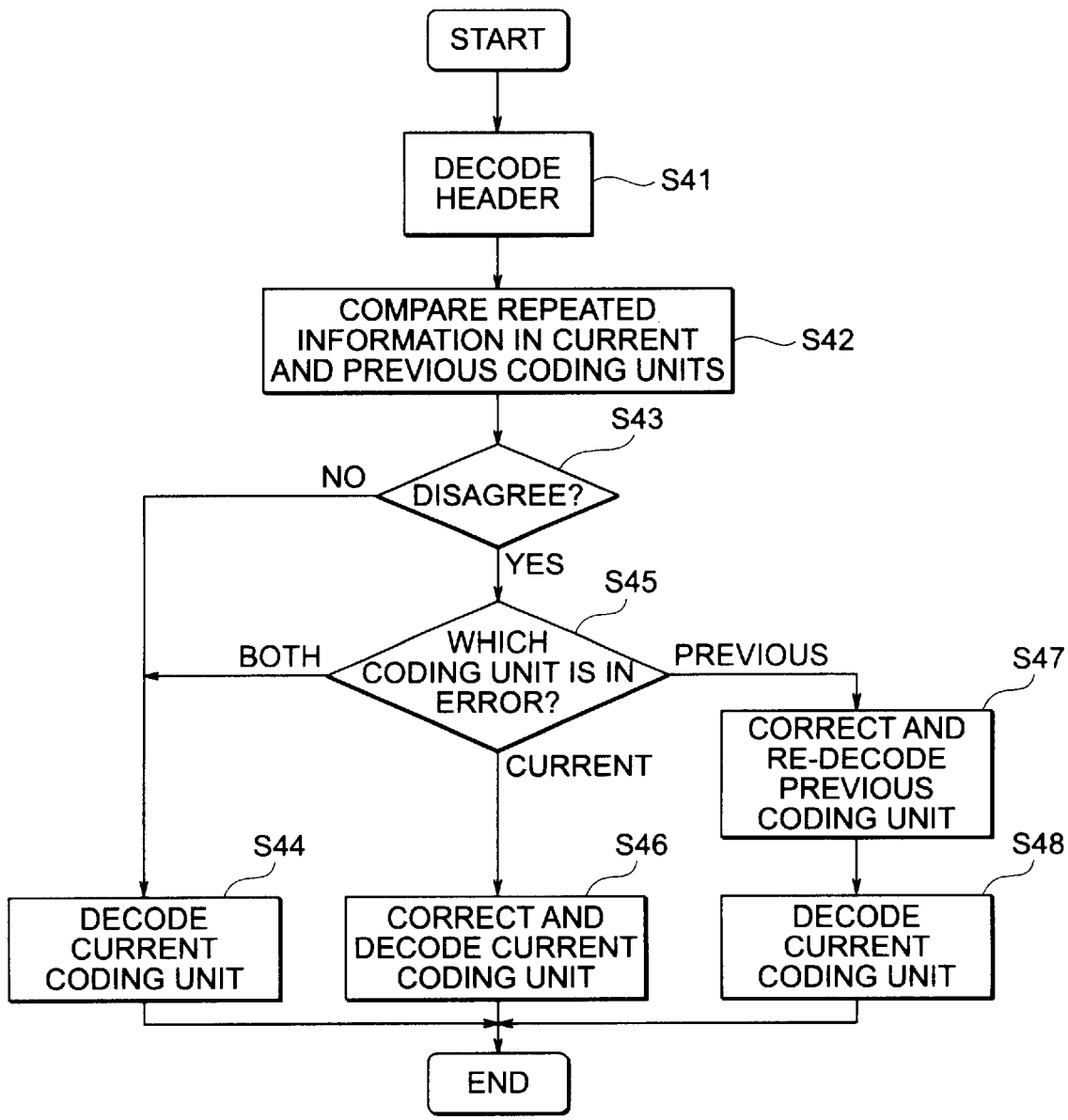
FIG. 9 is a flowchart illustrating the operation of the fourth embodiment.

Next, the operation of the fourth embodiment will be described. FIG. 9 illustrates the processing of one coding unit.

First, the header of the coding unit is decoded by the decoding unit 401 (step S41). The term 'header' is used herein to mean any type of data other than actual picture data. Repeated information included in the header is passed to the repeated-information comparison and correction unit 402, which compares the repeated information with corresponding information in a previous coding unit (step S42), and determines whether the current values and previous values of the repeated information agree (step S43). If they agree, the decoding unit 401 proceeds to decode the current coding unit (step S44).

If two compared values do not agree, the repeated-information comparison and correction unit 402 uses the error flags to decide which coding unit contains the correct value of the repeated information (step S45). If the error flags indicate an error in the current coding unit and not in the previous coding unit, the repeated-information comparison and correction unit 402 corrects the value in the current coding unit and the decoding unit 401 decodes the current coding unit, using the corrected value (step S46). If the error flags indicate an error in the previous coding unit and not in the current coding unit, the repeated-information comparison and correction unit 402 corrects the value in the previous coding unit and the re-decoding unit 403 decodes the previous coding unit again, using the corrected value (step S47), while the decoding unit 401 decodes the current coding unit (step S48). If the error flags indicate errors in both coding units, the repeated-information comparison and correction unit 402 does not attempt to correct either error, and the decoding unit 401 decodes the current coding unit, following conventional error-handling procedures.

Information typically repeated in picture coding includes not only the temporal reference of each frame and the quantization step size, but also the type of coding (inter-frame or intra-frame) and various other coding mode information (type and range of motion vectors, usage of adjacent predictions, use of coding options). Errors in this information can have drastic effects on the decoded picture. By enabling such errors to be corrected in a high proportion of cases, the fourth embodiment can greatly reduce the frequency of severe picture degradation.

As an example, FIG. 10A shows a frame divided into two slices, having a four-bit temporal reference value of ten (binary 1010). This temporal reference value is duplicated in both slices, as shown. A one-bit error in the second slice can change this value from ten to fourteen (binary 1110). In conventional apparatus, the two slices would then be regarded as belonging to different frames, half of each of which has been lost, as shown in FIG. 10B. In the fourth embodiment, an error flag supplied with the second slice enables the repeated-information comparison and correction unit 402 to correct the error, so that the frame is decoded and displayed correctly, as a single frame, as in FIG. 10C.

In a variation of the fourth embodiment, before the actual decoding of the picture data in a frame begins, the headers of all slices in the frame are read, and repeated information in slices flagged as having errors is corrected according to the information included in the error-free slices. This variation entails a slight delay, because decoding of the first slice in the frame does not begin until the last slice has been received, but it enables all repeated information to be corrected before any decoding takes place, so the decoding process does not have to be repeated later. The decoding process is thereby simplified, and the complexity and power consumption of the decoding apparatus 400 can be reduced. Specifically, the re-decoding unit 403 can be eliminated.

In another variation, the decoding apparatus 400 receives packet sequence numbers, as in the second embodiment. By checking the packet sequence numbers, the repeated-information comparison and correction unit 402 can detect gaps in the repeated information.

In another variation, when more than two instances of the same repeated information are transmitted, as when a frame is divided into more than two slices, for example, the repeated-information comparison and correction unit 402 compares all available instances, and uses both the error flags and majority-rule logic to decide which values are correct. In this case, the repeated-information comparison and correction unit 402 may correct values in more than one previous coding unit at a time.

5th Embodiment

The fifth embodiment uses the error flags provided by the transmission layer to disentangle two coding units that overlap due to an error.

Figure 11:
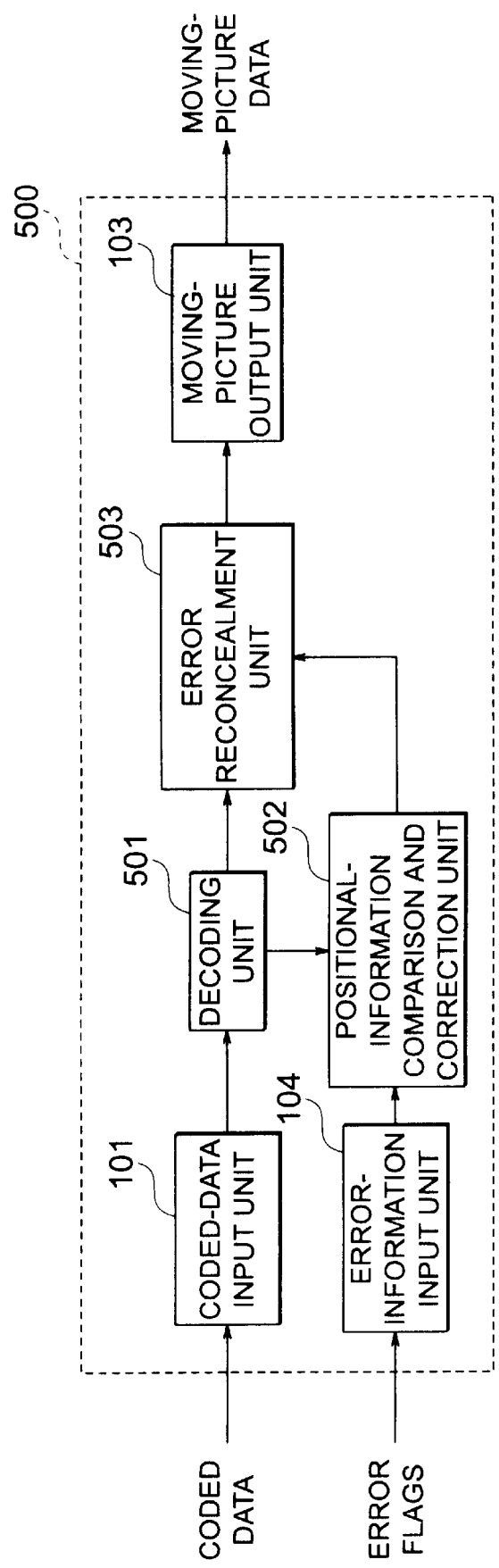
FIG. 11 is a block diagram of the decoding apparatus in a fifth embodiment.

Referring to FIG. 11, the decoding apparatus 500 in the fifth embodiment comprises a coded-data input unit 101, moving-picture output unit 103, and error-information input unit 104 as described in the first embodiment, a modified decoding unit 501, and a positional-information comparison and correction unit 502 and error reconcealment unit 503.

The decoding unit 501 decodes each received coding unit, passes the decoded data, together with information needed for error reconcealment, to the error reconcealment unit 503, and notifies the positional-information comparison and correction unit 502 of the starting and ending positions of the coding unit. The starting and ending positions refer to the starting and ending positions of the coding unit when displayed on the screen. The decoding unit 501 may receive corrected information in return from the positional-information comparison and correction unit 502, in which case the decoding unit 501 uses the corrected information in the decoding process. In decoding the data, the decoding unit 501 also checks the data validity by detecting illegal codewords, illegal numerical values, and other violations of coding rules, and preferably corrects any detected errors on the basis of related valid data, if possible. If unable to correct a serious error, the decoding unit 501 stops decoding and performs error concealment instead.

The positional-information comparison and correction unit 502 temporarily stores the positional information received from the decoding unit 501 and error flags received from the error-information input unit 104, compares the starting position of the coding unit with the ending position of the previous coding unit, and determines whether the two coding units are adjacent, are separated, or overlap. If they overlap, the positional-information comparison and correction unit 502 uses the error flags provided by the error-information input unit 104 to decide which coding unit is out of position, and corrects its position. If the position of the current coding unit is corrected, the positional-information comparison and correction unit 502 returns the corrected positional information to the decoding unit 501. If the position of the previous coding unit is corrected, the positional-information comparison and correction unit 502 sends the corrected information to the error reconcealment unit 503. If the two coding units are separated from one another, the positional-information comparison and correction unit 502 instructs the error reconcealment unit 503 to carry out error concealment in the space between the two coding units.

The error reconcealment unit 503 temporarily stores the decoded data and other information received from the decoding unit 501. Upon receiving corrected positional information pertaining to the previous coding unit from the positional-information comparison and correction unit 502, the error reconcealment unit 503 performs error concealment for that coding unit again, if necessary, using the corrected positional information, and modifies error concealment processing that may have been carried out in spaces adjacent the misplaced previous coding unit, again on the basis of the corrected positional information. If instructed by the positional-information comparison and correction unit 502 to carry out error concealment in the space between the current and previous coding units, the error reconcealment unit 503 performs the requested error concealment.

Figure 12:
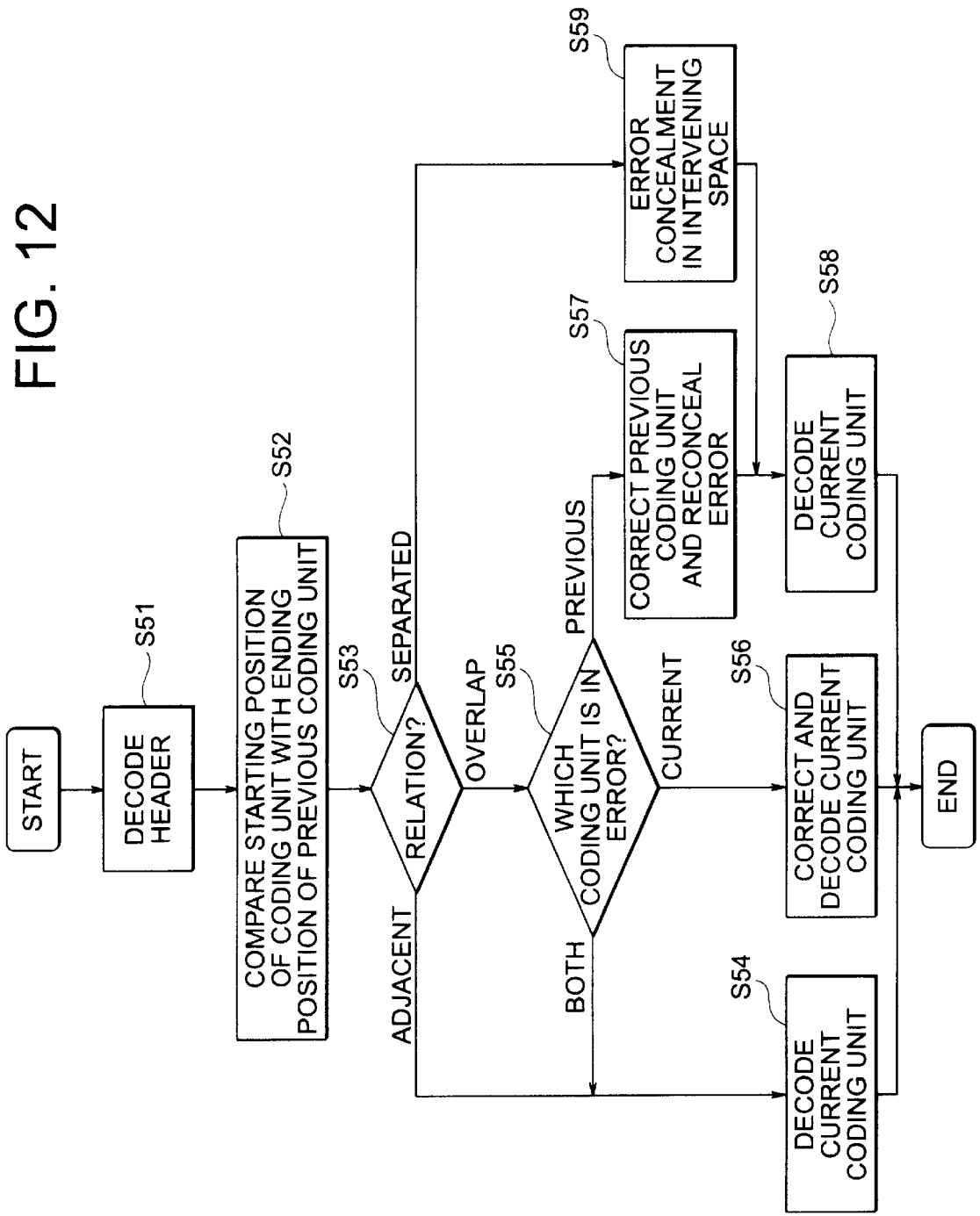
FIG. 12 is a flowchart illustrating the operation of the fifth embodiment.

Next, the operation of the fifth embodiment will be described. FIG. 12 illustrates the processing of one coding unit.

First, the header of the coding unit is decoded by the decoding unit 501 (step S51). The positional information included in the header is passed to the positional-information comparison and correction unit 502, which compares the starting position of the current coding unit with ending position of the previous coding unit (step S52), and determines whether the two units are adjacent, overlapping, or separated (step S53). If they are adjacent, the decoding unit 501 proceeds to decode the current coding unit (step S54).

If two coding units overlap, the positional-information comparison and correction unit 502 uses the error flags to decide which coding unit is in the wrong position (step S55). If the error flags indicate an error in the current coding unit and not in the previous coding unit, the positional-information comparison and correction unit 502 corrects the position of the current coding unit and the decoding unit 501 decodes the current coding unit, using the corrected positional information (step S56). If the error flags indicate an error in the previous coding unit and not in the current coding unit, the positional-information comparison and correction unit 502 corrects the position of the previous coding unit, and the error reconcealment unit 503 carries out error concealment as necessary, using the corrected positional information (step S57), while the decoding unit 501 decodes the current coding unit (step S58). If the error flags indicate errors in both coding units, the positional-information comparison and correction unit 502 does not attempt to correct the position of either coding unit, and the decoding unit 501 decodes the current coding unit, following conventional error-concealment procedures to cope with the overlap (step S54).

If the two coding units are separated, the error reconcealment unit 503 carries out error concealment in the space between the two coding units as directed by the positional-information comparison and correction unit 502 (step S59).

When two coding units overlap, in conventional apparatus, since it is not possible to tell which of the two coding units is out of place, one of the two coding units is arbitrarily accepted as being correctly positioned and the other coding unit is discarded, or the overlapping part of the other coding unit is discarded. Since this practice often produces severe picture distortion, some systems discard both coding units. By using the error flags supplied by the error-information input unit 104, the fifth embodiment is usually able to position both coding units correctly, so that both can be fully decoded. Serious picture degradation and the need for extensive error concealment are thereby avoided.

The fifth embodiment has been described as if the coding units were slices, but the coding units may be frames, in which case the fifth embodiment resolves temporal-reference conflicts produced by transmission errors.

In a variation of the fifth embodiment, the decoding apparatus 500 receives packet sequence numbers from the transmission layer, as in the second embodiment, and the positional-information comparison and correction unit 502 uses the sequence numbers to identify packet loss. When each packet corresponds to one coding unit, for example, packet loss should always result in a gap between the two coding units received before and after the lost packet. If the two coding units are adjacent, the positional-information comparison and correction unit 502 recognizes that one of the coding units must be out of place, and uses the error flags to decide which coding unit this is.

6th Embodiment

The sixth embodiment uses the error information supplied by the transmission layer to place a coding unit in the correct frame, even when packet loss extends over several frames. The coding units in the sixth embodiment are slices of frames.

Figure 13:
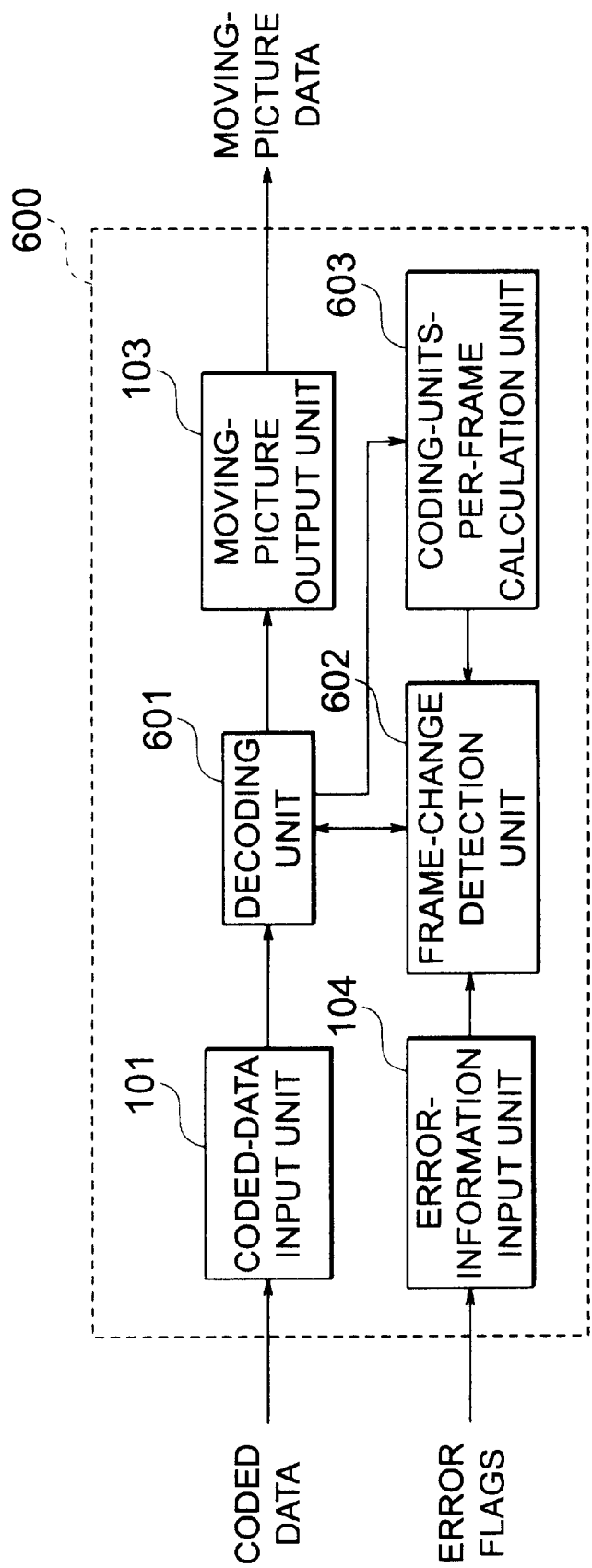
FIG. 13 is a block diagram of the decoding apparatus in a sixth embodiment.

Referring to FIG. 13, the decoding apparatus 600 in the sixth embodiment comprises a coded-data input unit 101, moving-picture output unit 103, and error-information input unit 104 as described in the first embodiment, a modified decoding unit 601, and a frame-change detection unit 602 and coding-units-per-frame calculation unit 603.

The decoding unit 601 decodes each received coding unit, passes the decoded data to the moving-picture output unit 103, and passes the frame-change detection unit 602 and coding-units-per-frame calculation unit 603 information, such as the frame temporal reference and slice position information, for use in identifying the temporal position of the coding unit. In return, the decoding unit 601 may receive instructions to update the temporal reference from the frame-change detection unit 602, in which case the decoding unit 601 uses the updated temporal reference in further decoding. In decoding the data, the decoding unit 601 also checks the data validity by detecting illegal codewords, illegal numerical values, and other violations of coding rules, and preferably corrects any detected errors on the basis of related valid data, if possible. If unable to correct a serious error, the decoding unit 601 stops decoding and performs error concealment instead.

The frame-change detection unit 602 receives error information from the error-information input unit 104 and information from the coding-units-per-frame calculation unit 603 indicating the number of coding units per frame, and uses this information to detect frame changes that may not be explicitly indicated in the information received by the decoding apparatus 600. For example, if the coding-units-per-frame calculation unit 603 indicates that there are five coding units per frame, and after four coding units in the current frame have been received, the error information indicates that the next two coding units are missing due to packet loss, the frame-change detection unit 602 notifies the decoding unit 601 that the next coding unit to be received belongs to the next frame.

The coding-units-per-frame calculation unit 603 calculates or otherwise determines the number of coding units per frame, and notifies the frame-change detection unit 602 of this number and the reliability of this number.

In some coding standards, such as H.324, the number of coding units per frame is determined through a negotiation or handshaking process at the beginning of communication between the transmitting terminal and receiving terminal. There are also standards in which the number of coding units per frames is fixed, as in H.263 Annex R. In these cases, the coding-units-per-frame calculation unit 603 simply notifies the frame-change detection unit 602 of the number specified in the standard or the number established in the negotiation process, this number being completely reliable.

There are also systems, however, that vary the number of coding units per frame, so that the amount of coded data per coding unit stays substantially constant. In this case, the coding-units-per-frame calculation unit 603 calculates the number of coding units per frame by taking an average of this number over the preceding several frames. When little or no motion is present, each frame tends to have the same number of coding units, so the calculated average is usually an accurate prediction of the number of coding units in the current frame, and the coding-units-per-frame calculation unit 603 indicates that the number supplied to the frame-change detection unit 602 has a comparatively high reliability. When the number of coding units per frame is observed to be highly variable, the coding-units-per-frame calculation unit 603 indicates that the provided number is less reliable.

Figure 14:
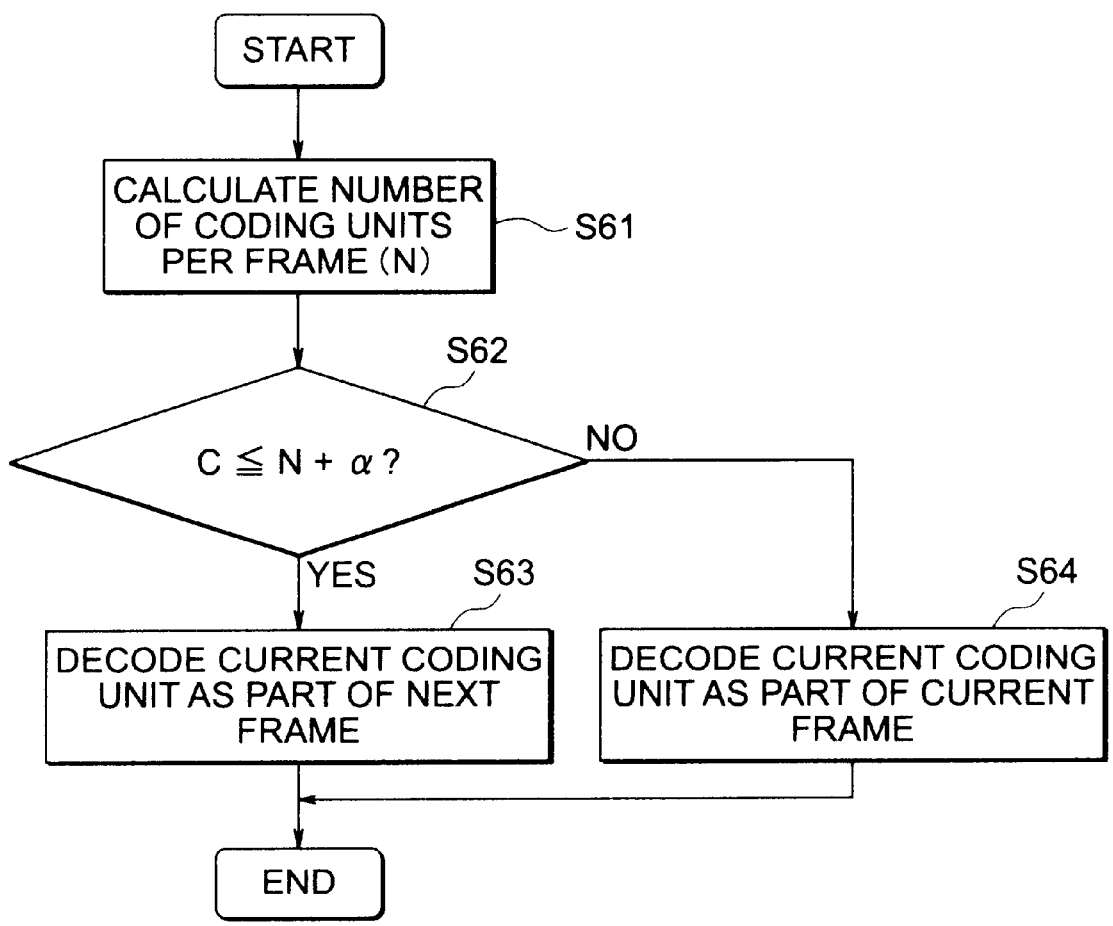
FIG. 14 is a flowchart illustrating the operation of the sixth embodiment.

Next, the operation of the sixth embodiment will be described. FIG. 14 illustrates the processing of one coding unit.

As the decoding apparatus 600 receives coding units from the transmission layer, the coding-units-per-frame calculation unit 603 calculates the number of coding units per frame (step S61). The frame-change detection unit 602 counts the number (C) of coding units received in the current frame, as indicated by the information obtained from the decoding unit 601 and by the error flags obtained from the error-information input unit 104, indicating missing coding units, and compares this number with the sum of the number of coding units per frame (N) indicated by the coding-units-per-frame calculation unit 603 and an offset ($\alpha$) that depends on the reliability of the number supplied by the coding-units-per-frame calculation unit 603 (step S62). As long as the number of coding units counted in the current frame stays within this sum (N+$\alpha$), the decoding unit 601 continues to decode the coding units as belonging to the current frame (step S63). If the number exceeds the sum, the frame-change detection unit 602 notifies the decoding unit 601 of a frame change, and the decoding unit 601 decodes the current coding unit as part of the next frame (step S64).

The decision in step S62 is used when the frame to which a coding unit belongs is not explicitly indicated in the coding unit itself. If the frame to which the coding unit belongs can be determined from information given in the coding unit, such as a temporal reference or positional information, this information is given priority over the decision in step S62.

Figure 15A:
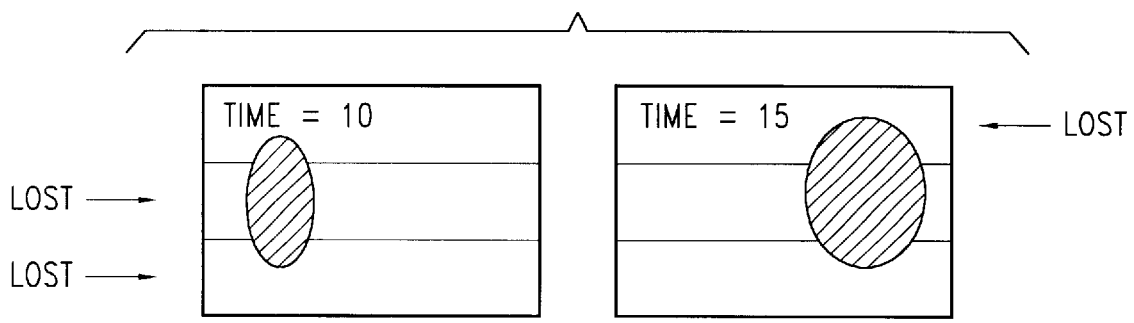
FIGS. 15A, 15B, and 15C illustrate the effect of the sixth embodiment.
Figure 15B:
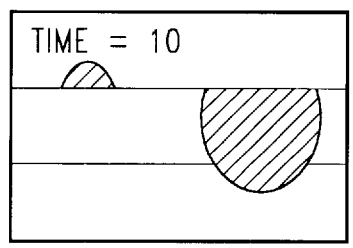
Figure 15C:
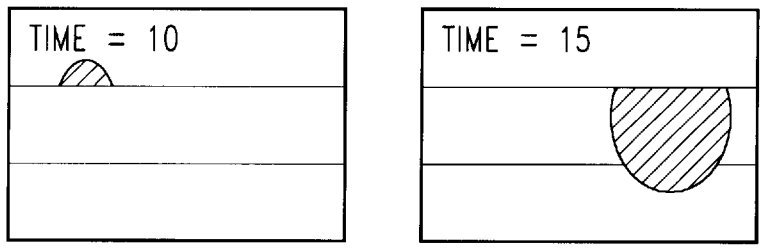

The sixth embodiment is particularly effective in dealing with packet loss that continues over an interval including parts of two or more frames. FIG. 15A shows an example in which two consecutive frames, with temporal references of ten and fifteen, are divided into three slices each, but the last two slices of the first frame and the first slice of the next frame are lost. The temporal reference is given only in the first slice of each frame, so in conventional apparatus, the received slices would be combined into a single frame with a temporal reference of ten and a distorted appearance, as shown in FIG. 15B. In the sixth embodiment, the loss of data is detected from error flags, and the frame-change detection unit 602 notifies the decoding unit 601 that the second two received slices belong to a different frame from the first received slice. The decoded slices are then correctly positioned in their respective frames, as shown in FIG. 15C, avoiding the confusing frame shown in FIG. 15B. To reduce picture degradation further, the missing parts of the frames in FIG. 15C can be supplied by conventional error concealment procedures.

In a variation of the sixth embodiment, the decoding apparatus 600 receives packet sequence numbers from the transmission layer, and uses these sequence numbers to detect packet loss and infer the frames to which the received coding units belong. In many cases, the correct frame can be identified from the packet sequence numbers, even if the error information supplied by the error-information input unit 104 is incomplete or incorrect.

7th Embodiment

The seventh embodiment pertains to inter-frame coding, in which a frame is coded and decoded predictively, with reference to a preceding frame. In the seventh embodiment, coding units flagged as containing errors are not used for reference in decoding the next frame.

Figure 16:
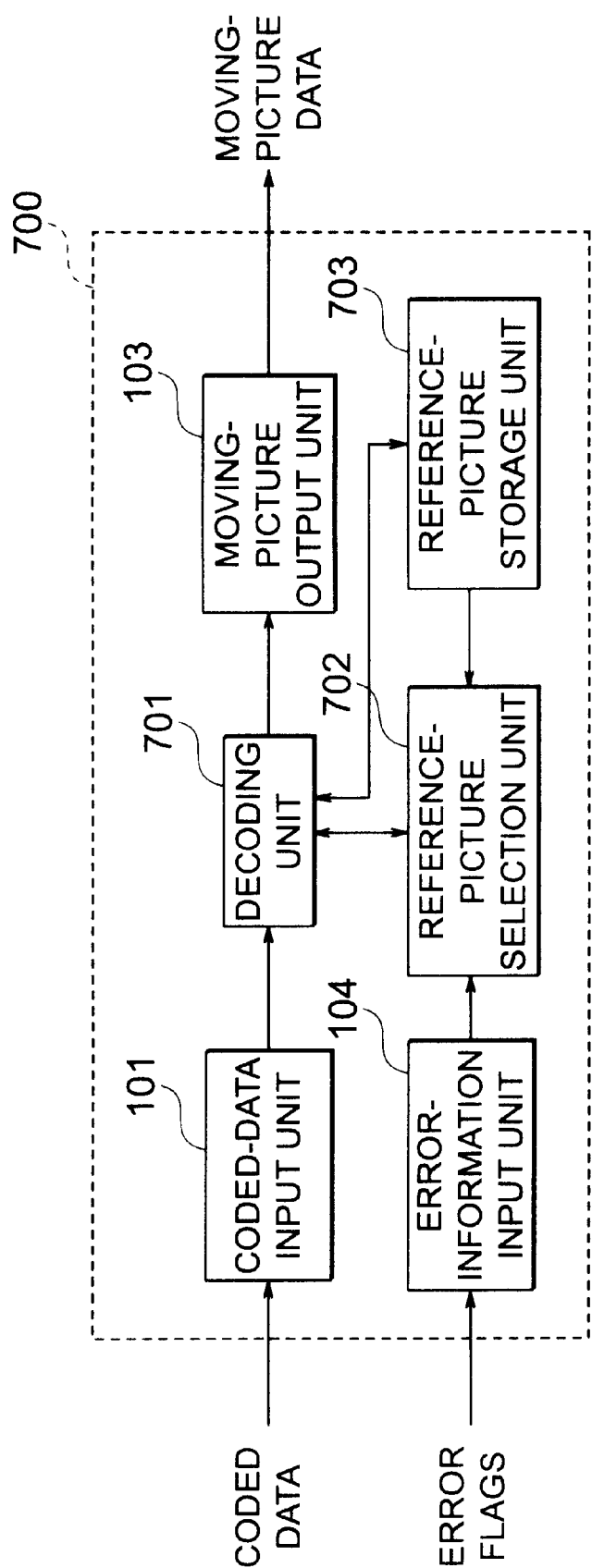
FIG. 16 is a block diagram of the decoding apparatus in a seventh embodiment.

Referring to FIG. 16, the decoding apparatus 700 in the sixth embodiment comprises a coded-data input unit 101, moving-picture output unit 103, and error-information input unit 104 as described in the first embodiment, a modified decoding unit 701, and a reference-picture selection unit 702 and reference-picture storage unit 703.

The decoding unit 701 decodes each received coding unit, using reference data stored in the reference-picture storage unit 703, and passes the decoded data to the moving-picture output unit 103 and reference-picture storage unit 703. In decoding the data, the decoding unit 701 also checks the data validity by detecting illegal codewords, illegal numerical values, and other violations of coding rules, and preferably corrects any detected errors on the basis of related valid data, if possible. If unable to correct a serious error, the decoding unit 701 stops decoding and performs error concealment instead. The decoding unit 701 passes all of the decoded data or error-concealed data to the moving-picture output unit 103, but passes the reference-picture storage unit 703 only the data decoded from coding units selected by the reference-picture selection unit 702.

The reference-picture selection unit 702 receives the error information supplied by the error-information input unit 104, selects coding units not flagged as having errors, and notifies the decoding unit 701 of the selected coding units.

The reference-picture storage unit 703 stores the data decoded from the selected coding units, overwriting the stored data of the preceding frame. If the coding units are slices with different sizes, shapes, or locations in different frames, the reference-picture storage unit 703 overwrites the data of the preceding frame without regard to the slice boundaries in the preceding frame.

Figure 17:
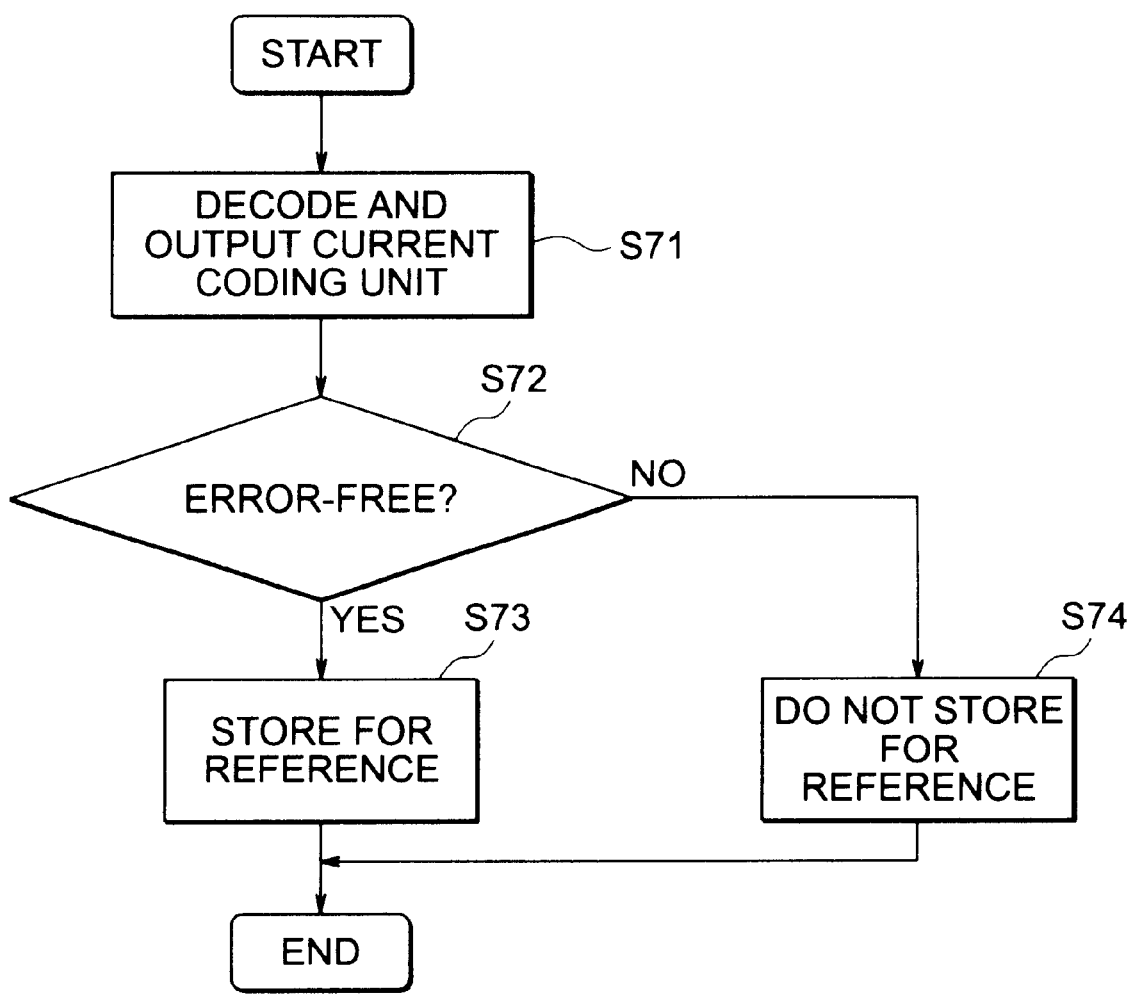
FIG. 17 is a flowchart illustrating the operation of the seventh embodiment.

Next, the operation of the seventh embodiment will be described. FIG. 17 illustrates the processing of one coding unit.

The coding unit is decoded by the decoding unit 701 and output by the moving-picture output unit 103 (step S71). The reference-picture selection unit 702 determines, from the error flags supplied by the error-information input unit 104, whether the coding unit was error-free (step S72). If error-free, the coding unit is stored in the reference-picture storage unit 703 for reference in decoding the next frame (step S73). If the coding unit is not error-free, it is not stored in the reference-picture storage unit 703 (step S74), leaving the picture data from the preceding frame unaltered in the area occupied by the erroneous coding unit.

The seventh embodiment avoids using picture data that might be seriously degraded by an error as reference data, thereby avoiding the propagation of severe decoding errors into the next frame. Error propagation is not completely eliminated, because the reference data left in the reference-picture storage unit 703 from the preceding frame may differ from the correct reference data, but the severity of error propagation is reduced.

8th Embodiment

The eighth embodiment pertains to a system in which the transmission layer retransmits erroneous data. If errors also occur in the retransmitted data, both the originally transmitted data and the retransmitted data are decoded, and the least erroneous data are used.

The receiving apparatus 50 in the transmission layer in the eighth embodiment is configured to provide all received data to the decoding apparatus. In case of retransmissions, the receiving apparatus 50 passes both the original received data and the retransmitted data to the decoding apparatus. A conventional receiving apparatus can be modified for use in the eighth embodiment by eliminating the conventional processes of selecting retransmitted data and discarding earlier transmitted data. These modifications can be made in an obvious way, so a detailed description of the receiving apparatus 50 in the eighth embodiment will be omitted.

Figure 18:
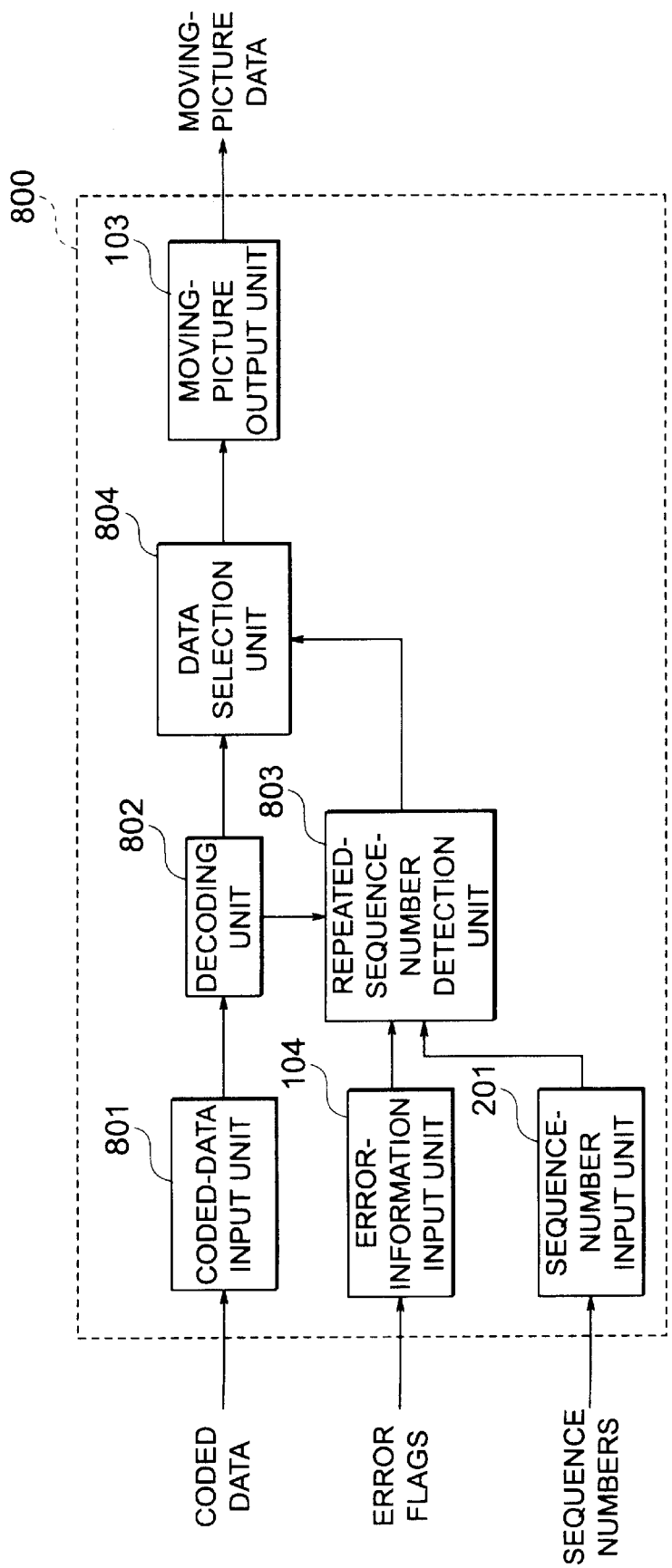
FIG. 18 is a block diagram of the decoding apparatus in an eighth embodiment.

Referring to FIG. 18, the decoding apparatus 800 in the sixth embodiment comprises a moving-picture output unit 103 and error-information input unit 104 as described in the first embodiment, a sequence-number input unit 201 as described in the second embodiment, a modified coded-data input unit 801 and decoding unit 802, and a repeated-sequence-number detection unit 803 and data selection unit 804.

The coded-data input unit 801 receives each coding unit from the transmission layer, and provides the coded data to the decoding unit 802. If a coding unit has been retransmitted in the transmission layer, the coded-data input unit 801 receives both the original erroneous data and all of the retransmitted data, which may or may not be erroneous.

The decoding unit 802 decodes each received coding unit, and provides the decoded data to the data selection unit 804. If the same coding unit is received more than once because of retransmission, the decoding unit 802 decodes the coding unit each time it is received. In decoding the data, the decoding unit 802 also checks data validity by detecting illegal codewords, illegal numerical values, and other violations of coding rules, and preferably corrects any detected errors on the basis of related valid data, if possible. If unable to correct a serious error, the decoding unit 802 stops decoding and performs error concealment instead.

The repeated-sequence-number detection unit 803 checks the error flags supplied by the error-information input unit 104 to determine whether the coding unit currently being decoded includes an error. If this is the case, the repeated-sequence-number detection unit 803 checks the packet sequence number or numbers of the erroneous coding unit, and determines whether they duplicate packet sequence numbers already received. Duplicate packet sequence numbers indicate retransmission. If two coding units have matching sequence numbers, the first coding unit will normally also have an active error flag, which was the reason for the retransmission. If the second coding unit also has an active error flag, the repeated-sequence-number detection unit 803 notifies the data selection unit 804 of the duplicate sequence numbers.

When notified of duplicate sequence numbers by the repeated-sequence-number detection unit 803, the data selection unit 804 compares the decoded results of the original and retransmitted coding units, and selects which of them to output. The decision is made by comparing the decoded coding units with surrounding coding units, or with corresponding coding units in the preceding frame, and selecting the decoded data differing least in pixel values or motion information. The selected data will usually be the less erroneous data. The data selection unit 804 may select a single decoded coding unit for output, or may select parts of two or more decoded coding units. If each coding unit comprises multiple blocks, for example, the data selection unit 804 can make a separate selection for each block.

Figure 19:
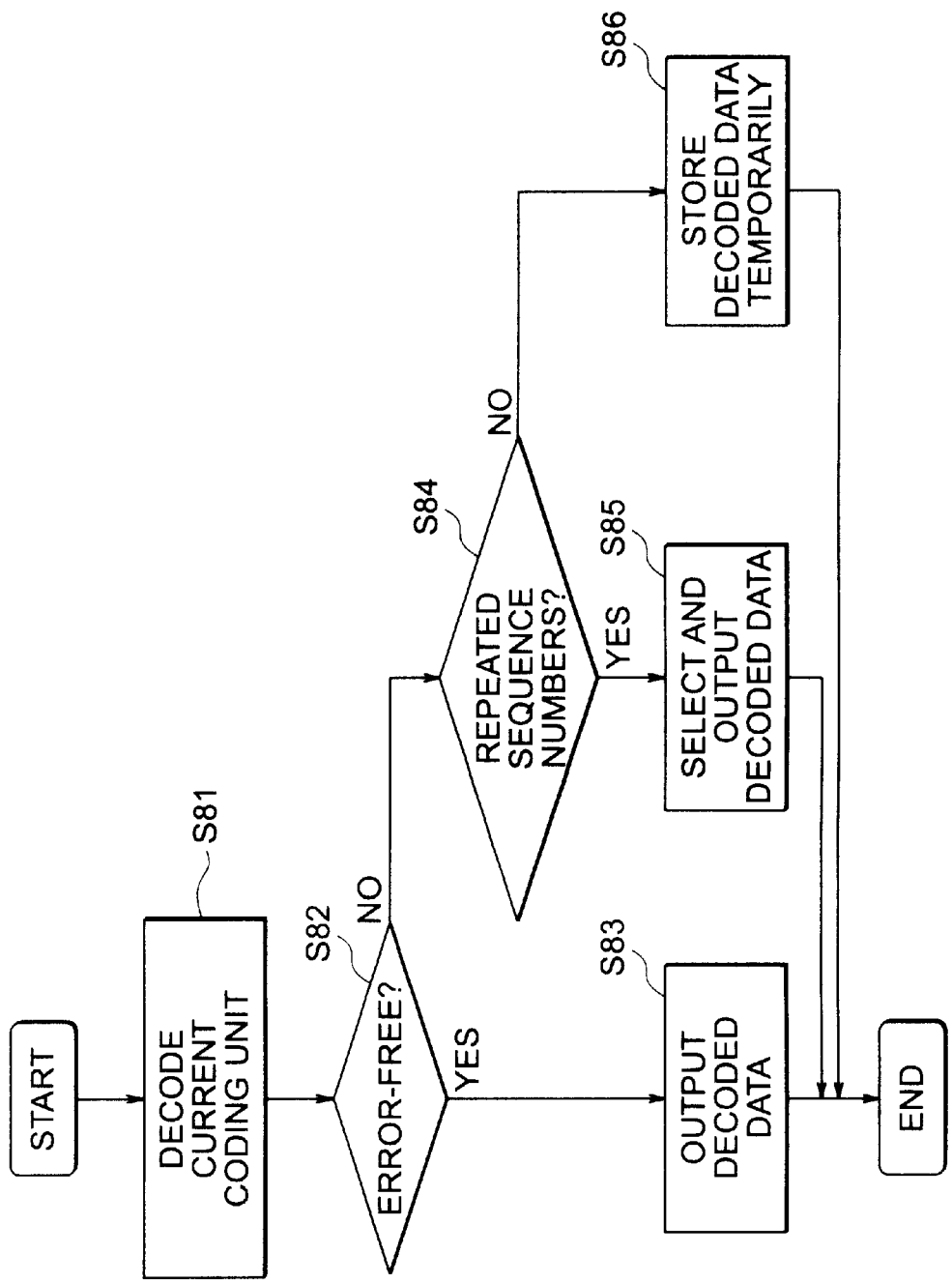
FIG. 19 is a flowchart illustrating the operation of the eighth embodiment.

Next, the operation of the eighth embodiment will be described. For simplicity, it will be assumed that the transmission layer requests the retransmission of an erroneous packet at most once. FIG. 19 illustrates the processing of a coding unit in this case.

The coding unit is received and decoded by the decoding unit 802, with conventional error handling (step S81). From the error flags supplied by the error-information input unit 104, the repeated-sequence-number detection unit 803 decides whether the coding unit is free of errors (step S82). If the coding unit is error-free, the moving-picture output unit 103 outputs the decoded data (step S83). In particular, if the coding unit is a retransmitted coding unit that was received without errors, the decoded retransmitted data are output in step S83.

If the coding unit is flagged as including an error, the repeated-sequence-number detection unit 803 determines whether its packet sequence number or numbers repeat those of a coding unit already decoded (step S84). If this is the case, then both the current coding unit and the previous coding unit include errors, so the data selection unit 804 selects the less erroneous data for output (step S85). If this is not the case, the data selection unit 804 stores the decoded data temporarily, to see if another coding unit with the same packet sequence number or numbers will be received later (step S86). If no such retransmitted coding unit arrives, the stored coding unit is output.

When the same coding unit is transmitted twice and transmission errors occur both times, the procedure in FIG. 19 selects the decoded data best matching the surrounding or preceding data, thereby reducing the picture degradation caused by the transmission errors.

In most conventional systems, when the same coding unit is retransmitted, the coding unit received in the first transmission is discarded in the transmission layer, and the retransmitted data must be used in the decoding layer, even if the retransmitted data contain more serious errors than the first transmitted data.

Among existing transmission systems, there are systems that allow more than one retransmission of the same data, up to a predetermined number of retransmissions. There are also systems that allow any number of retransmissions, provided that all transmissions of the same coding unit or packet take place within a predetermined time. In these systems, the procedure in FIG. 19 is altered by carrying out step S86 even if a 'yes' result is obtained in step S84, until a predetermined time has elapsed from the reception of the first coding unit with the same packet sequence number, or until it is certain that no more retransmitted copies of this coding unit will arrive. Then the repeated-sequence-number detection unit 803 compares all received copies of the coding unit, and selects the least erroneous data for output.

In another variation of the eighth embodiment, instead of checking frame sequence numbers, the repeated-sequence-number detection unit 803 checks temporal reference information, slice positional information, or other information that can be used to identify retransmitted coding units.

9th Embodiment

The ninth embodiment is a modification of the eighth embodiment in which retransmitted coded data are compared with the coded data received previously, and only the differing parts are decoded.

Figure 20:
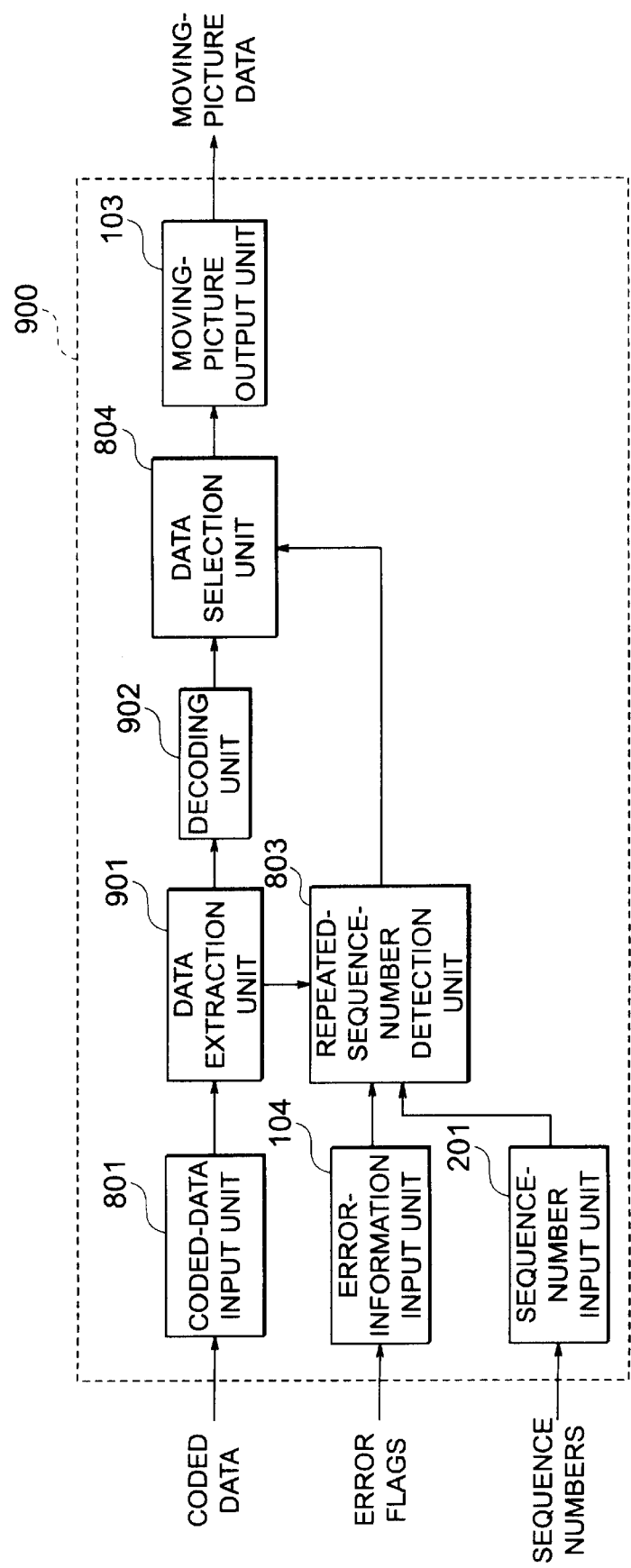
FIG. 20 is a block diagram of the decoding apparatus in a ninth embodiment.

Referring to FIG. 20, the decoding apparatus 900 in the sixth embodiment comprises a moving-picture output unit 103 and error-information input unit 104 as described in the first embodiment, a sequence-number input unit 201 as described in the second embodiment, a coded-data input unit 801, repeated-sequence-number detection unit 803, and data selection unit 804 as described in the eighth embodiment, a data extraction unit 901, and a modified decoding unit 902.

The data extraction unit 901 temporarily stores each coding unit received from the coded-data input unit 801. Normally, the data extraction unit 901 also passes each received coding unit to the decoding unit 902. When notified by the repeated-sequence-number detection unit 803 that the received coding unit duplicates a coding unit received previously, however, the data extraction unit 901 compares the received coding unit with all previously received copies of the same coding unit, extracts those parts of the received coding unit that differ from the corresponding parts in all previously received copies, and passes the extracted parts to the decoding unit 902.

The decoding unit 902 decodes each received coding unit, and provides the decoded data to the data selection unit 804. If the same coding unit is received more than once because of retransmission, the decoding unit 902 decodes the differing data extracted by the data extraction unit 901, using the other data received earlier from the data extraction unit 901 as necessary in the decoding process. Parts of the received data not extracted by the data extraction unit 901 may be regarded as having been correctly received the previous time, because the same data have now been received twice. In decoding the data, the decoding unit 902 also checks data validity as in the eighth embodiment, and preferably corrects any detected errors on the basis of related valid data, if possible. If unable to correct a serious error, the decoding unit 802 stops decoding and performs error concealment instead.

Figure 21:
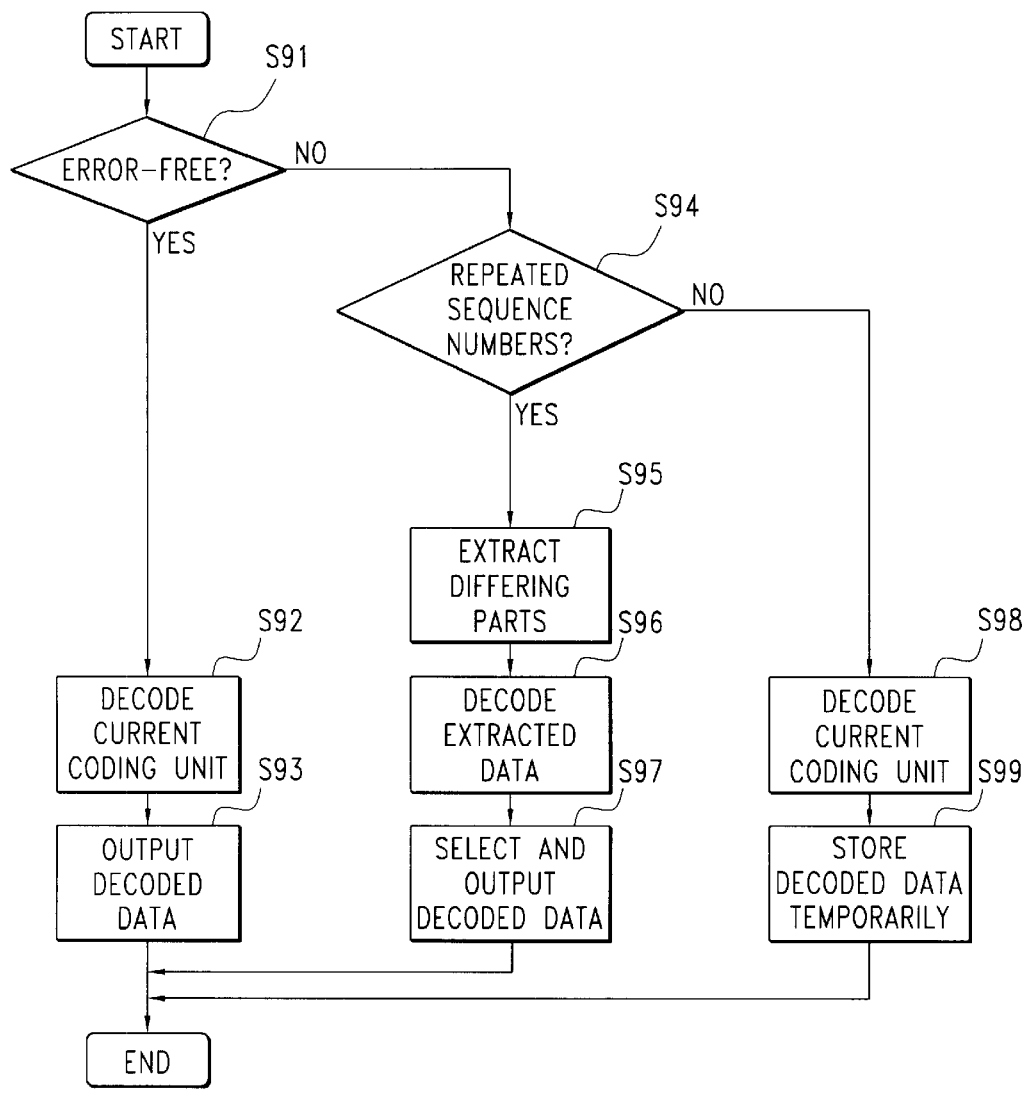
FIG. 21 is a flowchart illustrating the operation of the ninth embodiment.

Next, the operation of the ninth embodiment will be described. For simplicity, it will again be assumed that the transmission layer requests the retransmission of an erroneous packet at most once. FIG. 21 illustrates the processing of a coding unit in this case.

When the coding unit is received, the repeated-sequence-number detection unit 803 determines from the error flags whether the coding unit is error-free (step S91). If error-free, the coding unit is decoded (step S92) and output (step S93).

If the coding unit is flagged as including an error, the repeated-sequence-number detection unit 803 determines whether its packet sequence number or numbers repeat those of a coding unit already decoded (step S94). If this is the case, then the data extraction unit 901 extracts the parts of the coding unit that differ from the previously received copy of the same coding unit (step S95), the decoding unit 902 decodes the extracted parts (step S96), and the data selection unit 804 selects for output the least erroneous data from among the previously decoded data and the newly decoded extracted data (step S97). If this is not the case, the decoding unit 902 decodes the received coding unit, carrying out conventional error handling (step S98), and the data selection unit 804 stores the decoded data temporarily, pending decoding of the next coding unit (step S99). If not notified that the next coding unit has the same packet sequence number or numbers, the data selection unit 804 passes both the temporarily stored coding unit and the next coding unit to the moving-picture output unit 103.

Figure 22:
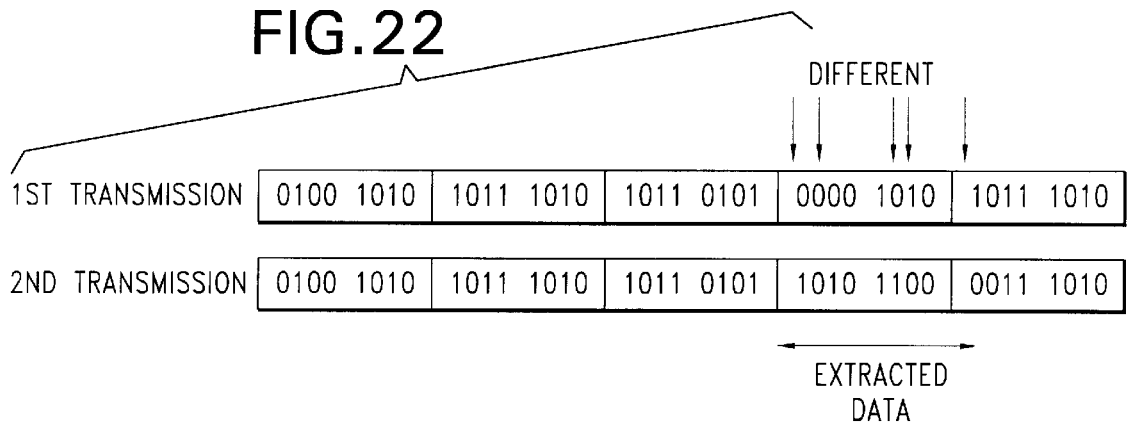
FIG. 22 illustrates data extracted following a burst error in the ninth embodiment.

Particularly in wireless transmission systems, errors tend to occur in bursts, as shown in FIG. 22, in which a burst of errors occurs in the fourth byte and the first bit of the fifth byte. When the data are retransmitted, the data extraction unit 901 notes the differences occurring at these bit positions, and extracts the indicated nine-bit segment. More generally, in step S96 the data extraction unit 901 extracts any segment of data in which errors occur at a predetermined rate, or higher, over a predetermined time.

Outside the nine-bit segment in FIG. 22, since the same data have been received twice, it is highly probable that the received data are correct, and the decoding unit 902 and data selection unit 804 can take this high probability into account in performing error handling, error concealment, and data selection.

As in the eighth embodiment, the procedure in FIG. 21 can be adapted for use in systems that allow more than one retransmission, by storing each erroneous coding unit until all retransmitted copies of the same coding unit have been received. The repeated-sequence-number detection unit 803 may also use temporal reference information or other information instead of packet sequence numbers.

The ninth embodiment provides the same effects as the eighth embodiment, but with less processing, since identical parts of retransmitted coding units are not decoded twice. The processing time is thereby shortened, and less power is consumed. In addition, by comparing different received copies of the same coding unit and detecting identical parts, the ninth embodiment obtains information that can be used to confirm that the identical parts have been received and decoded correctly.

The above embodiments have been described separately, but they can be used in various combinations.

The invention can be practiced either in hardware or in software.

The invention is not restricted to systems that transmit moving pictures, but can also be practiced in systems that transmit still pictures, systems that transmit sound, or in any transmission systems that transmit coded data, provided that the data are divided for coding purposes into coding units, and for transmission purposes into transmission units, and the transmission units are related in some definite way to the coding units, so that error flags indicating transmission errors in transmission units can be transferred to the coding layer and applied to specific coding units.

In a sound transmission system, the coding units are, for example, audio frames representing a sound segment with a fixed duration. The position of an audio frame refers to its position on the time axis, rather than its spatial position. The fifth embodiment, which corrects the positions of coding units, is applicable to coded sound data, with the term 'position' indicating position on the time axis. The term 'transmission' has implicitly been used in the narrow sense of transmission over a communication channel between two separated locations. The invention is also applicable, however, when the term 'transmission' is interpreted in a broader sense, denoting any type of signal transmission. For example, the invention can be practiced in a device that reproduces video data from an optical disc, such as a digital video disc or digital versatile disc (DVD), on which data are stored in tracks divided into sectors. The transmission unit in this case is one sector. The coding unit is as described above: a frame, slice, group of blocks, or other standard coding unit. The device includes an optical head that reads the data from the disc. The receiving apparatus 50 comprises circuits that process the electrical signals output by the optical head, including error detection and correction circuits.

Those skilled in the art will recognize that further variations are possible within the scope claimed below.

What is claimed is:

1. A method of receiving and decoding coded data in a system having a transmission layer and a coding layer, the coded data being divided into transmission units, each transmission unit being received separately in the transmission layer, errors being detected in each transmission unit in the transmission layer, the received data being converted to coding units in the transmission layer, the coding units having a definite relation to the transmission units, the coding units being provided to the coding layer, each coding unit being decoded separately in the coding layer, comprising the steps of:

providing error information from the transmission layer to the coding layer, said error information reporting results of error detection performed in the transmission layer by indicating which of the coding units provided from the transmission layer to the coding layer are free of errors; and using said error information, when information repeated in different coding units has different values in the different coding units, to select a correct value from among said different values.

2. A method of receiving and decoding coded data in a system having a transmission layer and a coding layer, the coded data being divided into transmission units, each transmission unit being received separately in the transmission layer, errors being detected in each transmission unit in the transmission layer, the received data being converted to coding units in the transmission layer, the coding units having a definite relation to the transmission units, the coding units being provided to the coding layer, each coding unit being decoded separately in the coding layer, comprising the steps of:

providing error information from the transmission layer to the coding layer, said error information reporting results of error detection performed in the transmission layer by indicating which of the coding units provided from the transmission layer to the coding layer are free of errors; and using said error information to position said coding units in relation to one another.

3. A method of receiving and decoding coded data in a system having a transmission layer and a coding layer, the coded data being divided into transmission units, each transmission unit being received separately in the transmission layer, errors being detected in each transmission unit in the transmission layer, the received data being converted to coding units in the transmission layer, the coding units having a definite relation to the transmission units, the coding units being provided to the coding layer, the coding units being coded predictively, with reference to previous coding units, each coding unit being decoded separately in the coding layer, comprising the steps of:

providing error information from the transmission layer to the coding layer, said error information reporting results of error detection performed in the transmission layer by indicating which of the coding units provided from the transmission layer to the coding layer are free of errors; and using said error information to select reliable reference data for use in decoding said coding units.

4. A method of receiving and decoding coded data in a system having a transmission layer and a coding layer, the coded data being divided into transmission units, each transmission unit being received separately in the transmission layer, errors being detected in each transmission unit in the transmission layer, the received data being converted to coding units in the transmission layer, the coding units having a definite relation to the transmission units, the coding units being provided to the coding layer, the coded data being moving-picture data comprising successive frames, each coding unit being decoded separately in the coding layer, comprising the steps of:

providing error information from the transmission layer to the coding layer, said error information reporting results of error detection performed in the transmission layer by indicating which of the coding units provided from the transmission layer to the coding layer are free of errors; and using said error information to place each coding unit in a correct one of said frames.

5. The method of claim 4, wherein said step of using said error information to place each coding unit in a correct one of said frames further comprises the steps of:

determining a number of said coding units per frame; and using said error information to detect missing coding units, thereby detecting frame changes not indicated in the received coding units.

6. A method of receiving and decoding coded data in a system having a transmission layer and a coding layer, the coded data being divided into transmission units, each transmission unit being received separately in the transmission layer, errors being detected in each transmission unit in the transmission layer, the received data being converted to coding units in the transmission layer, the coding units having a definite relation to the transmission units, the coding units being provided to the coding layer, each coding unit being decoded separately in the coding layer, comprising the steps of:

providing error information from the transmission layer to the coding layer, said error information reporting results of error detection performed in the transmission layer by indicating which of the coding units provided from the transmission layer to the coding layer are free of errors;

using said results of error detection when said coding units are decoded in the coding layer;

requesting retransmission of transmission units in which errors are detected in said transmission layer, thereby obtaining multiple copies of a single coding unit derived by conversion of at least one of said transmission units in which errors are detected;

providing said multiple copies from said transmission layer to said coding layer; and selecting least erroneous data from among said multiple copies, when said error information indicates that none of said multiple copies is free of errors.

7. The method of claim 6, further comprising the steps of:

comparing said multiple copies of said single coding unit in said coding layer; and in each copy of said single coding unit, decoding only data differing from previous copies of said single coding unit.

8. The method of claim 6, comprising the further steps of:

comparing said multiple copies of said single coding unit in said coding layer; and decoding identical data received in said multiple copies as if said identical data had been indicated to be free of errors.

9. A method of receiving and decoding coded data in a system having a transmission layer and a coding layer, the coded data being divided into transmission units having sequence numbers, each transmission unit being received separately in the transmission layer, errors being detected in each transmission unit in the transmission layer, the received data being converted to coding units in the transmission layer, the coding units having a definite relation to the transmission units, the coding units being provided to the coding layer, each coding unit being decoded separately in the coding layer, comprising the steps of:

using results of error detection performed in the transmission layer when said coding units are decoded in the coding layer;

providing said sequence numbers from said transmission layer to said coding layer; and using said sequence numbers when said coding units are decoded in said coding layer.

10. The method of claim 9, wherein said step of using said sequence numbers comprises the further step of:

using said sequence numbers to detect missing coding units.

11. An apparatus for receiving and decoding coded data divided into transmission units, comprising:

a receiving apparatus receiving each transmission unit, detecting errors in each said transmission unit, and converting the received transmission units to coding units having a definite relation to the transmission units; and a decoding apparatus coupled to said receiving apparatus, receiving said coding units, and decoding each one of said coding units separately, said decoding apparatus being provided with error information resulting from error detection performed in said receiving apparatus, said error information indicating whether each of said coding units is free of errors, and said decoding apparatus comprising:

an error-information input circuit receiving said error information; and a repeated-information comparison and correction circuit that compares information occurring repeatedly in different coding units, uses said error information, when said information is received with different values in said different coding units, to select a correct value from among said different values, and corrects each erroneous value of said information.

12. The apparatus of claim 11, said decoding apparatus further comprising a redecoding circuit decoding a previous one of said coding units again, using a corrected value provided by said repeated-information comparison and correction circuit, when said repeated-information comparison and correction circuit corrects an erroneous value in said previous one of said coding units.

13. The apparatus of claim 11, said decoding apparatus further comprising a decoding circuit decoding a current one of said coding units, using a corrected value provided by said repeated-information comparison and correction circuit, when said repeated-information comparison and correction circuit corrects an erroneous value in said current one of said coding units.

14. An apparatus for receiving and decoding coded data divided into transmission units, comprising:

a receiving apparatus receiving each transmission unit, detecting errors in each said transmission unit, and converting the received transmission units to coding units having a definite relation to the transmission units; and a decoding apparatus coupled to said receiving apparatus, receiving said coding units, and decoding each one of said coding units separately, said decoding apparatus being provided with error information resulting from error detection performed in said receiving apparatus, said error information indicating whether each of said coding units is free of errors, and said decoding apparatus comprising:

an error-information input circuit receiving said error information; and a positional-information comparison and correction circuit using said error information to reposition said coding units in relation to one another.

15. The apparatus of claim 14, said decoding apparatus further comprising:

a decoding circuit decoding said coding units and performing error concealment; and an error reconcealment circuit performing error concealment again, when said positional-information comparison and correction circuit repositions one of said coding units.

16. An apparatus for receiving and decoding coded data divided into transmission units, comprising:

a receiving apparatus receiving each transmission unit, detecting errors in each said transmission unit, and converting the received transmission units to coding units having a definite relation to the transmission units, said coding units being coded predictively, with reference to previous coding units; and a decoding apparatus coupled to said receiving apparatus, receiving said coding units, and decoding each one of said coding units separately, said decoding apparatus being provided with error information resulting from error detection performed in said receiving apparatus, said error information indicating whether each of said coding units is free of errors, and said decoding apparatus comprising:

an error-information input circuit receiving said error information;

a reference-data selection circuit using said error information to select reliable reference data for use in decoding said coding units; and a reference-data storage circuit storing the reference data selected by said reference-data selection circuit.

17. An apparatus for receiving and decoding coded data divided into transmission units, comprising:

a receiving apparatus receiving each transmission unit, detecting errors in each said transmission unit, and converting the received transmission units to coding units having a definite relation to the transmission units, said receiving apparatus requesting retransmission of transmission units in which errors are detected, thereby obtaining multiple copies of a single coding unit derived by conversion of at least one of said transmission units in which errors are detected; and a decoding apparatus coupled to said receiving apparatus, receiving said coding units, and decoding each one of said coding units separately, said decoding apparatus being provided with error information resulting from error detection performed in said receiving apparatus, said error information indicating whether each of said coding units is free of errors, said decoding apparatus being provided with said multiple copies by said receiving apparatus, and said decoding apparatus comprising:

an error-information input circuit receiving said error information;

a coded-data input circuit receiving said multiple copies of said single coding unit from said receiving apparatus; and a data selection circuit selecting least erroneous data from among said multiple copies, when said error information indicates that none of said multiple copies is free of errors.

18. The apparatus of claim 17, wherein said data selection circuit selects said least erroneous data according to differences between said single coding unit and adjacent coding units.

19. The apparatus of claim 17, further comprising:
a data extraction circuit extracting, from each one of said multiple copies, data differing from preceding ones of said multiple copies; and
a decoding circuit decoding the data extracted by said data extraction unit.

20. The apparatus of claim 17, wherein said data selection circuit processes identical data in said multiple copies of said single coding unit as having been decoded correctly.

21. An apparatus for receiving and decoding coded data divided into transmission units, comprising:
a receiving apparatus receiving each transmission unit, detecting errors in each said transmission unit, and converting the received transmission units to coding units having a definite relation to the transmission units, said coded data being moving-picture data comprising successive frames, said receiving apparatus detecting loss of transmission units as a type of error; and
a decoding apparatus coupled to said receiving apparatus, receiving said coding units, and decoding each one of said coding units separately, said decoding apparatus being provided with error information resulting from error detection performed in said receiving apparatus, said error information indicating whether each of said coding units is free of errors, said decoding apparatus being provided with dummy data by the receiving apparatus when said loss of transmission units is detected, and said decoding apparatus comprising:
an error-information input circuit receiving said error information;
a coded-data input circuit receiving both said coding units and said dummy data; and
a frame-change detection circuit using said error information to place each coding unit in a correct one of said frames.

22. The apparatus of claim 21, wherein said decoding apparatus further comprises a coding-units-per-frame calculation circuit determining a number of said coding units per frame, and said frame-change detection circuit uses said error information to detect missing coding units, thereby detecting frame changes not indicated in the received coding units.

23. The apparatus of claim 21, wherein said transmission units have sequence numbers, said receiving apparatus provides said sequence numbers to said decoding apparatus, said decoding apparatus further comprises a coding-units-per-frame calculation circuit determining a number of said coding units per frame, and said frame-change detection circuit uses said sequence numbers to detect missing coding units, thereby detecting frame changes not indicated in the received coding units.

24. An apparatus for receiving and decoding coded data divided into transmission units, comprising:
a receiving apparatus receiving each transmission unit, detecting errors in each said transmission unit, and converting the received transmission units to coding units having a definite relation to the transmission units; and
a decoding apparatus coupled to said receiving apparatus, receiving said coding units, and decoding each one of said coding units separately, using results of error detection performed in said receiving apparatus;
wherein said receiving apparatus detects loss of transmission units as a type of error, and provides said decoding apparatus with dummy data when said loss of transmission units is detected, and said decoding apparatus comprises:
a coded-data input circuit receiving both said coding units and said dummy data; and
an error-handling switching circuit causing error handling to be performed on said dummy data.

25. An apparatus for receiving and decoding coded data divided into transmission units, comprising:
a receiving apparatus receiving each transmission unit, detecting errors in each said transmission unit, and converting the received transmission units to coding units having a definite relation to the transmission units; and
a decoding apparatus coupled to said receiving apparatus, receiving said coding units, and decoding each one of said coding units separately, using results of error detection performed in said receiving apparatus;
wherein said transmission units have sequence numbers, said receiving apparatus provides said sequence numbers to said decoding apparatus, and said decoding apparatus uses said sequence numbers in decoding said coding units.

* * * * *